United States Patent
Katar et al.

(10) Patent No.: US 9,762,496 B2
(45) Date of Patent: Sep. 12, 2017

(54) SLOTTED MESSAGE ACCESS PROTOCOL FOR POWERLINE COMMUNICATION NETWORKS

(71) Applicant: QUALCOMM Incorporated, San Diego, CA (US)

(72) Inventors: Srinivas Katar, Fremont, CA (US); Lawrence Winston Yonge, III, Summerfield, FL (US); Sidney Brower Schrum, Jr., Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 14/629,485

(22) Filed: Feb. 23, 2015

(65) Prior Publication Data

US 2015/0244632 A1  Aug. 27, 2015

Related U.S. Application Data

(60) Provisional application No. 61/944,370, filed on Feb. 25, 2014.

(51) Int. Cl.
*H04L 12/851* (2013.01)
*H04B 3/54* (2006.01)
(Continued)

(52) U.S. Cl.
CPC .......... *H04L 47/2433* (2013.01); *H04B 3/54* (2013.01); *H04B 3/542* (2013.01); *H04B 3/544* (2013.01);
(Continued)

(58) Field of Classification Search
None
See application file for complete search history.

(56) References Cited

U.S. PATENT DOCUMENTS 5,642,421 A * 6/1997 Gray .................. H04Q 11/0478
370/477
6,026,082 A * 2/2000 Astrin ..................... H04M 3/56
370/336
(Continued)

OTHER PUBLICATIONS

"PCT Application No. PCT/US2015/017335 International Search Report", May 8, 2015, 13 pages.

*Primary Examiner* — Huy D Vu
*Assistant Examiner* — James P Duffy
(74) *Attorney, Agent, or Firm* — DeLizio Law, PLLC

(57) ABSTRACT

A slotted message access protocol can be implemented for transmitting short packets. Each beacon period may be divided into multiple time slots. At least one time slot may be assigned to a network device per beacon period based, at least in part, on latency specifications of packets that the network device is configured to transmit. In one example, some of the unassigned time slots may be designated as contention-based time slots. Network devices may contend with each other to gain control of and transmit packets during a contention-based time slot based on the priority level of the packets to be transmitted. Network devices may also use an encryption key and an initialization vector for securely exchanging short packets. Furthermore, a repeater network device may be designated to retransmit a packet, received from an original transmitting network device, during a communication time slot assigned to the original transmitting network device.

30 Claims, 13 Drawing Sheets

(51) Int. Cl.
  *H04L 12/28*    (2006.01)
  *H04L 12/801*    (2013.01)
  *H04J 3/16*    (2006.01)

(52) U.S. Cl.
  CPC .. *H04L 12/2838* (2013.01); *H04B 2203/5408* (2013.01); *H04J 3/1682* (2013.01); *H04L 47/13* (2013.01); *H04L 47/24* (2013.01); *H04L 2012/2843* (2013.01)

(56) References Cited

U.S. PATENT DOCUMENTS

| | | | | |
|---|---|---|---|---|
| 6,665,601 | B1* | 12/2003 | Nielsen | H04L 12/40 701/50 |
| 7,187,691 | B2* | 3/2007 | Gavette | H04L 12/40156 370/328 |
| 2002/0048368 | A1 | 4/2002 | Gardner | |
| 2002/0105970 | A1* | 8/2002 | Shvodian | H04W 16/14 370/468 |
| 2002/0122387 | A1* | 9/2002 | Ni | H04L 29/06 370/231 |
| 2003/0227373 | A1 | 12/2003 | Lou et al. | |
| 2003/0235196 | A1* | 12/2003 | Balachandran | H04L 47/10 370/392 |
| 2004/0028018 | A1* | 2/2004 | Cain | H04B 7/2643 370/338 |
| 2004/0208139 | A1 | 10/2004 | Iwamura et al. | |
| 2007/0025243 | A1* | 2/2007 | Ayyagari | H04B 3/54 370/229 |
| 2007/0058732 | A1* | 3/2007 | Riedel | H04B 3/542 375/257 |
| 2010/0220593 | A1 | 9/2010 | Fujiwara et al. | |
| 2010/0260085 | A1* | 10/2010 | Wang | H04W 74/02 370/311 |
| 2012/0093151 | A1 | 4/2012 | McFarland et al. | |
| 2013/0171999 | A1 | 7/2013 | Katar et al. | |

* cited by examiner

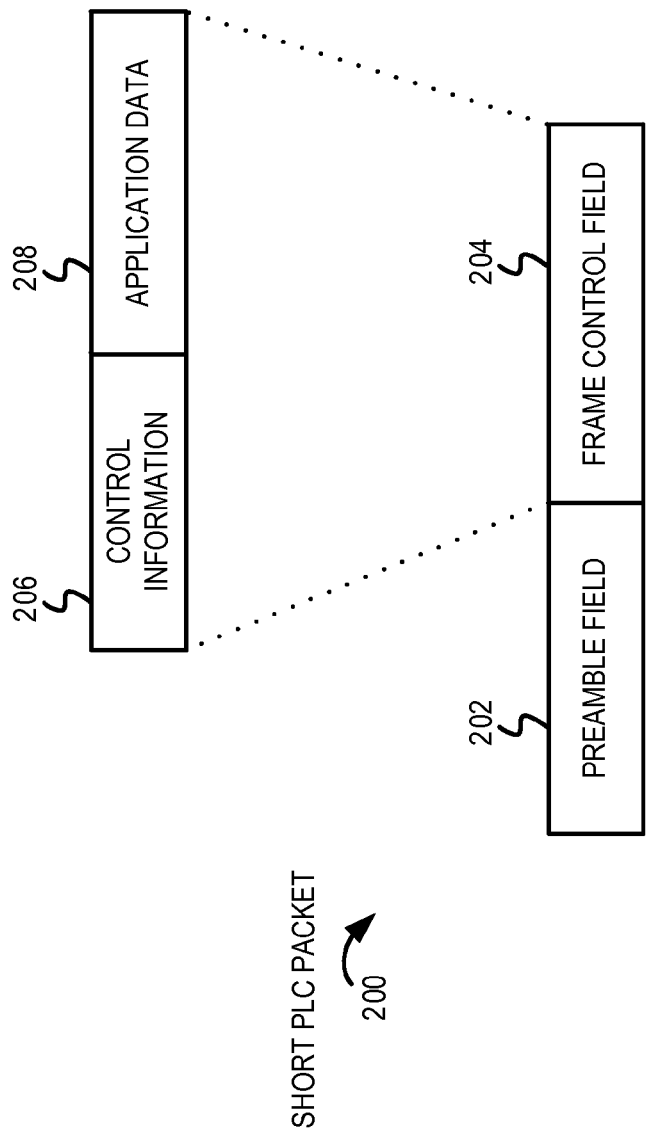

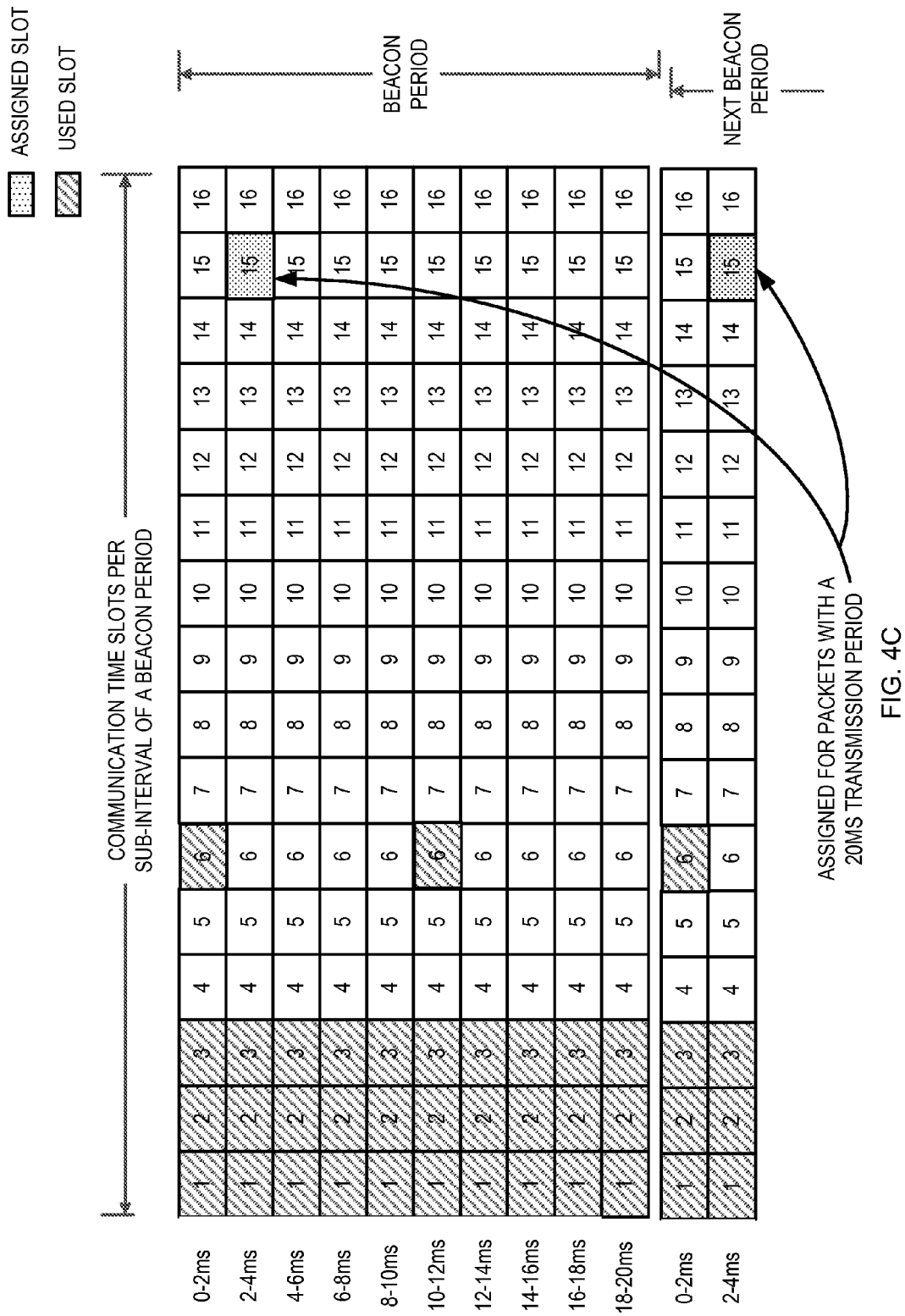

SLOTTED MESSAGE ACCESS PROTOCOL FOR POWERLINE COMMUNICATION NETWORKS

RELATED APPLICATIONS

This application claims the priority benefit of U.S. Provisional Application Ser. No. 61/944,370 filed Feb. 25, 2014.

BACKGROUND

Embodiments of the disclosure generally relate to the field of communication networks and, more particularly, to a slotted message access protocol for powerline communication (PLC) networks.

Electric power is transmitted over transmission lines at a high voltage, and is distributed to buildings and other structures at much lower voltages using electric power lines. Besides providing electric power, the electric power lines can also be used to implement powerline communications within buildings and other structures. Powerline communications can provide another communication medium for connecting various network nodes together in local and wide area networks. Powerline communications can allow electronic devices to connect to each other and to the Internet using existing alternating current (AC), direct current (DC), and unpowered wiring for communication. For example, HomePlug® devices can be used for wired communication using IEEE 1901 and HomePlug AV/AV2/GreenPHY standards for broadband over powerline communication.

Various types of vehicles, such as automobiles, typically include a collection of electric cables and/or wires that provide communication signals or electrical power between components of the vehicle. The collection of electrical cables and/or wires in the vehicle may also include wires to implement low-rate data buses, such as a local interconnect network (LIN) bus and a controller area network (CAN) bus for intra-vehicular communications. However, it is typically not desirable to use LIN and CAN buses in intra-vehicular communication networks because of the additional wires and complex wiring harnesses that are introduced into the vehicles to implement data communications. Configuring vehicular communication systems to implement PLC protocols may reduce the complexity and cost of the intra-vehicular communication networks because PLC networks typically use the power lines of the system both for providing power and for data communications. PLC networks usually do not need additional wires and/or complex wiring harnesses for data communications. However, it is typically not desirable to implement PLC protocols within the vehicles because the vehicular communication systems have specifications that are usually not supported by PLC protocols. For example, PLC protocols typically specify a frame format for PLC packets that includes a predefined length for the payload field. PLC protocols typically do not support transmitting PLC packets having a payload field that is less than the predefine length. Also, vehicular communication systems typically have stringent latency and reliability requirements.

SUMMARY

Various embodiments of a slotted message access protocol for packet transmissions in a communication network are disclosed. In one embodiment, a first network device may determine that a second network device will transmit a first packet associated with a first traffic class in the communication network. The first network device may allocate a first communication time slot of a beacon period to the second network device based, at least in part, on the first traffic class. The first network device may indicate to the second network device the first communication time slot during which the second network device can transmit the first packet.

BRIEF DESCRIPTION OF THE DRAWINGS

The present embodiments may be better understood, and numerous objects, features, and advantages made apparent to those skilled in the art by referencing the accompanying drawings.

FIG. 2 is a an example format of a short packet;

FIG. 4C is an example slot allocation table for allocating communication time slots for transmitting high latency packets;

DESCRIPTION OF EMBODIMENT(S)

Figure 1A:
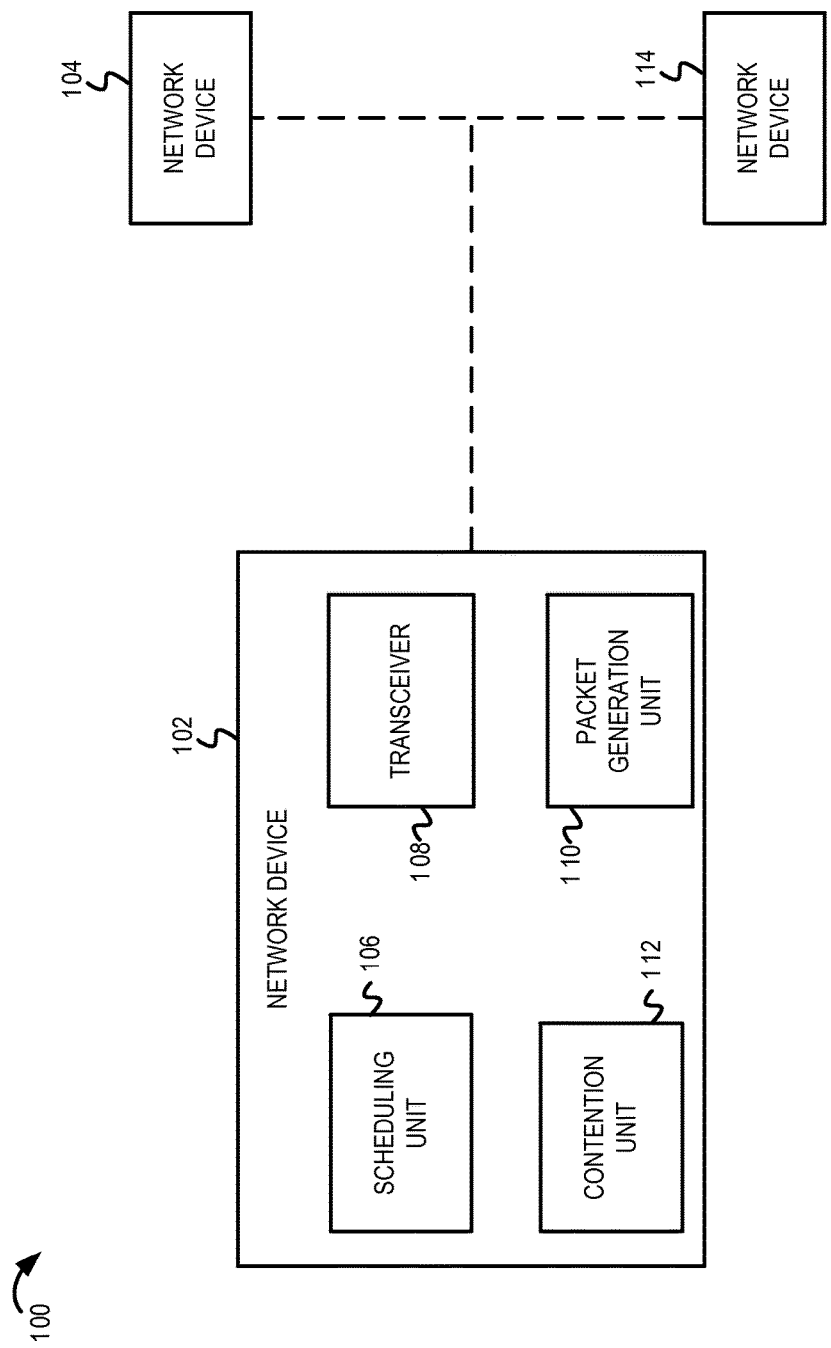
FIG. 1A is an example block diagram including a mechanism for transmitting a short packet using a slotted message access protocol in a communication network.

The description that follows includes exemplary systems, methods, techniques, instruction sequences, and computer program products that describe various embodiments of the present disclosure. However, it is understood that the described embodiments may be practiced without specific details disclosed. For example, embodiments describe transmitting messages in a powerline communication (PLC) network using HomePlug AV/AV2/GreenPHY or IEEE 1901 communication protocols. In other embodiments, the operations described herein can be extended to other wired communication protocols (e.g., multimedia over coax alliance (MoCA) protocols, Ethernet protocols, etc.) or wireless communication protocols (e.g., wireless local area network (WLAN) protocols such as IEEE 802.11 protocols). Wellknown instruction instances, protocols, structures, and techniques may not be shown in detail in order not to obfuscate the description.

A powerline network is a shared communication network in which multiple network devices are coupled to the powerline medium. In addition to providing electric power, the powerline network may also facilitate communications between PLC devices. As described above, a vehicle may use a low-rate data bus for intra-vehicular communications, such as a LIN bus and a CAN bus. The length of the packets exchanged between devices within the vehicle is typically very short (e.g., eight bytes). In some embodiments, a vehicle may be configured to implement PLC protocols (e.g., HomePlug AV/AV2/GreenPHY protocols, IEEE 1901 protocols) for intra-vehicular communications. Using PLC protocols for communication between devices in a vehicle can minimize the complexity of wiring harnesses and eliminate the need for additional data buses (e.g., a LIN bus and a CAN bus) in the vehicle. However, the frame format of a PLC packet typically includes a preamble field, a frame control field, and a payload field. The length of the payload field is typically predefined based on the communication protocols that are being implemented. Therefore, when the length of application data that will be transmitted between PLC devices is less than the predefined length of the payload field of a PLC packet, the PLC device embeds additional "0" bits or "pads" the application data, so that the resultant length of the application data equals the predefined length of the payload field. For example, if a PLC protocol uses a predefined payload field length of 136-bytes, a 76-byte padding may be added to transmit 60-byte application data within the predefined 136-byte payload field. However, padding a shorter payload with additional bytes for transmission in a longer predefined payload field length can increase overhead, increase latency, and decrease packet transmission efficiency.

In some embodiments, a network device can be configured to implement a slotted message access protocol (S-MAP) to efficiently transmit "short packets" and reduce latency. For example, the network device may be configured to transmit the application data in the frame control field without transmitting the payload field. In accordance with the S-MAP, the transmission time on a communication medium may be divided into communication time slots (also referred to as "S-MAP slots"). In some embodiments, a master network device may assign communication time slots to each client network device depending on different classes of traffic that will be transmitted by each client network device, as will be further described in FIGS. 3-4C. The different classes of traffic may be determined based on latency specifications, cycle time, and other suitable factors. Collision-free transmission in contention-free communication slots may be achieved by assigning communication time slots for exclusive use by an assigned network device. Latency specifications can be met by assigning communication time slots with high frequency to a network device that transmits low-latency traffic. Likewise, a network device that transmits high-latency traffic may be assigned communication time slots that occur less frequently in time. For example, if the client network device is configured to transmit packets with a 2 ms latency, the master network device may assign a unique contention-free communication time slot to the client network device every 2 ms.

In some embodiments, one or more communication time slots may be designated as contention-based communication time slots. Network devices may contend for the opportunity to transmit packets during the contention-based communication time slots based, at least in part, on the priority level of the packets, as will be further described in FIGS. 5 and 6. The network devices may also transmit short packets using encryption and decryption techniques that will be described in FIG. 7. Furthermore, a network device may be designated as a repeater network device to improve transmission reliability. The repeater network device may receive a packet from an original transmitting network device. The repeater network device may retransmit the received packet during a communication time slot assigned to the original transmitting network device, as will be described in FIGS. 8 and 9. Adapting existing communication protocols to transmit the application data using a short packet during assigned communication time slots can minimize overhead and packet collisions, reduce latency, and improve communication efficiency and reliability.

FIG. 1A is an example block diagram including a mechanism for transmitting a short packet using a slotted message access protocol (S-MAP) in a communication network 100. The communication network 100 includes network devices 102, 104, and 114. The network device 102 includes a scheduling unit 106, a transceiver 108, a packet generation unit 110, and a contention unit 112. Although not shown in FIG. 1A for simplicity, the network devices 104 and 114 may also include a scheduling unit, a transceiver, a packet generation unit, and a contention unit. The network devices 102, 104, and 114 may be configured to execute operations described herein for short packet communication during communication time slots that are allocated using the S-MAP, as will be further described below. The network devices 102, 104, and 114 may be communicatively coupled with each other using wired and/or wireless communication links, depicted in FIG. 1A using dashed lines.

In one embodiment, the communication network 100 may be a powerline communication network and the network devices 102, 104, and 114 may each be PLC-capable devices. In some embodiments, the network devices 102, 104, and 114 may operate using a HomePlug 1.0/AV/AV2/GreenPHY communication protocol, an IEEE 1905 communication protocol, or another suitable PLC protocol. In some embodiments, in addition to (or instead of) the PLC protocol, the network devices 102, 104, and 114 may implement other suitable wired communication protocols (e.g., Ethernet protocols, MoCA protocols, etc.) and/or wireless communication protocols (e.g., WLAN protocols, such as IEEE 802.11 protocols). In some embodiments, the network devices 102, 104, and 114 may be electronic devices, such as a desktop computer, a laptop computer, a tablet computer, a mobile phone, a smart appliance, a navigation device, a media player, a gaming console, a network bridging device, an access point, or another electronic device that implement wired and/or wireless communication protocols. In some embodiments, one or more of the network devices 102, 104, and 114 may be a standalone or dedicated PLC device that directly connects to an AC outlet of a powerline network (not shown). In some embodiments, the network devices 102, 104, and 114 may be electronic devices that are part of a communication network of a vehicle, as will be further described below in FIG. 1B.

In some embodiments, the network devices 102 and 104 can be configured to implement the S-MAP to efficiently transmit short packets in the communication network 100. The S-MAP may be a message-oriented protocol that can be used to transmit short packets (e.g., 12 bytes of application data). In one implementation, the packet generation unit 110 of the network device 102 may determine to transmit application data to the network device 104 during a communication time slot assigned to the network device 102 using the S-MAP. The packet generation unit 110 may determine whether the application data should be transmitted in a short packet depending on the length of the application data. For example, the number of bytes of application data may be compared against a threshold. The threshold number of bytes may be determined based, at least in part, on the number of bytes that can be transmitted in the payload field of a conventional PLC packet. If the number of bytes of application data does not exceed the threshold, the packet generation unit 110 may determine that the application data should be transmitted in a short packet. In one example, a vehicle may determine to transmit a short payload (e.g., between one and twelve bytes) for internal communications, such as to control a vehicle entertainment system, open/close doors, adjust vehicle mirrors, and so on.

The S-MAP may enable reliable transmission of short broadcast/multicast packets even when the packets have stringent latency specifications (e.g., 2 ms latency). The S-MAP may also enable contention-free channel access with guaranteed latencies. In some embodiments, the S-MAP may be a time domain multiple access (TDMA) based protocol that divides transmission time on the communication medium ("time-on-wire") communication time slots. The communication time slots may also be referred to as "S-MAP slots." As will be further described with reference to FIGS. 3 and 4A-C, the master network device (e.g., network device 102) may assign communication time slots to each network device for transmitting different classes of traffic. The different classes of traffic may be determined based on latency and cycle time specifications. For example, a packet that belongs to a first traffic class may have a 10 ms period (also referred to as cycle time or inter-packet arrival time) and a 2 ms latency, and a packet that belongs to a second traffic class may have a 50 ms period and a 10 ms latency. The scheduling unit 106 of the master network device may assign contention-free communication time slots for exclusive use by an assigned client network device (e.g., network device 104). The number of communication time slots and the frequency with which the communication time slots are assigned to the client network device may depend on the latency specifications of the client network device. For example, the client network device that transmits low-latency traffic may be assigned unique communication time slots that occur more frequently in time so that latency specifications can be met. In another example, the client network device that transmits high-latency traffic may be assigned unique communication time slots that occur less frequently in time.

In some embodiments, the communication time slots may be assigned exclusively to each assigned network device for transmitting packets associated with one or more traffic classes. For example, if 10 communication time slots are assigned to a first client network device, the first client network device may use the assigned 10 communication time slots to transmit packets that belong to any traffic class. In this example, a second client network device may not transmit packets during the 10 communication time slots assigned to the first client network device. In another embodiment, the communication time slots may be assigned exclusively to an assigned network device for transmitting packets associated with a specific traffic class. For example, a first set of communication time slots may be uniquely assigned to a first client network device for transmitting a first traffic class, a second set of communication time slots may be uniquely assigned to the first client network device for transmitting a second traffic class, and so on. In this example, the first client network device may not transmit the second traffic class during the first set of communication time slots. Additionally, a second network device may not transmit any packets during the first and the second set of communication time slots allocated to the first client network device.

In one embodiment, the duration of the communication time slot may be 125 μs, the duration of the short packet may be 110.48 μs, and the duration of the inter-frame spacing may be 14.52 μs. In this example, if the duration of the beacon period is 20 ms, each beacon period may include 160 communication time slots. However, in other embodiments, the beacon period, the communication time slot, the short packet, and the inter-frame spacing may have other suitable durations. In some embodiments, each communication time slot may be long enough to transmit at least a single short packet including a 16-byte or 32-byte HomePlug AV frame control field and the corresponding inter-frame spacing. The scheduling unit 106 may assign a different communication time slot to each network device to avoid the possibility of collisions between network devices. However, the network device may transmit any suitable number of packets within its assigned communication time slot. For example, the network device 104 may transmit one 16-byte packet using a 16-byte HomePlug AV frame control field or may transmit two 16-byte packets using a 32-byte HomePlug AV frame control field. In another example, the network device 104 may use a short frame control field that includes a single orthogonal frequency division multiplexing (OFDM) symbol as described by the HomePlug AV2 specification. The HomePlug AV2 frame control field may be a 16-byte or 32-byte field with a shorter duration. For example, the duration may be 55 μs. In this example, a 62.5 μs communication time slot may be used to double the packet transmission rate compared to another frame control field that includes more than one OFDM symbol. In some embodiments, using the short frame control field may enable the network device 104 to maintain a more relaxed time synchronization as compared to transmitting multiple packets within a single frame control field.

In addition to assigning communication time slots to network devices in the communication network 100, the scheduling unit 106 of the master network device (e.g., network device 102) may designate one or more of the communication time slots per beacon period for transmitting a beacon message. The beacon message may be used to provide a timing reference so that other network devices can estimate the start/stop time instants of their respective communication time slots. In some embodiments, the master network device may transmit the beacon message during the first N communication time slots of each beacon period. In another embodiment, the master network device may transmit the beacon message during the last N communication time slots of each beacon period. In another embodiment, the master network device may transmit the beacon message during any suitable communication time slots of each beacon period. Referring to the above example where the beacon period is 20 ms and the duration of each communication time slot is 125 μs, the master network device may use the first four communication time slots (e.g., 500 μs interval) of each beacon period to transmit the beacon message. The remaining 156 communication time slots may be used for exchanging packets between network devices.

In some embodiments, the master network device may transmit the beacon message using HomePlug AV mini robust OFDM (mini-ROBO) transmission modulation. However, in other embodiments, the master network device may transmit the beacon message using a frame control transmission modulation or another suitable transmission modulation. In another embodiment, the master network device may transmit a reference signal (e.g., a clock signal) that provides timing information as the beacon message. The beacon message may include varying amounts of information depending on the transmission modulation that is used to transmit the beacon message. For example, the beacon message may not include additional information about the state of the communication network 100 if the beacon message is a clock signal. In another example, the beacon message may include information about the state of the communication network 100, network devices that are operating in a power save mode, the operating state of the vehicle, etc. if the beacon message is transmitted using a HomePlug AV mini-ROBO or frame control transmission modulation.

Figure 5:
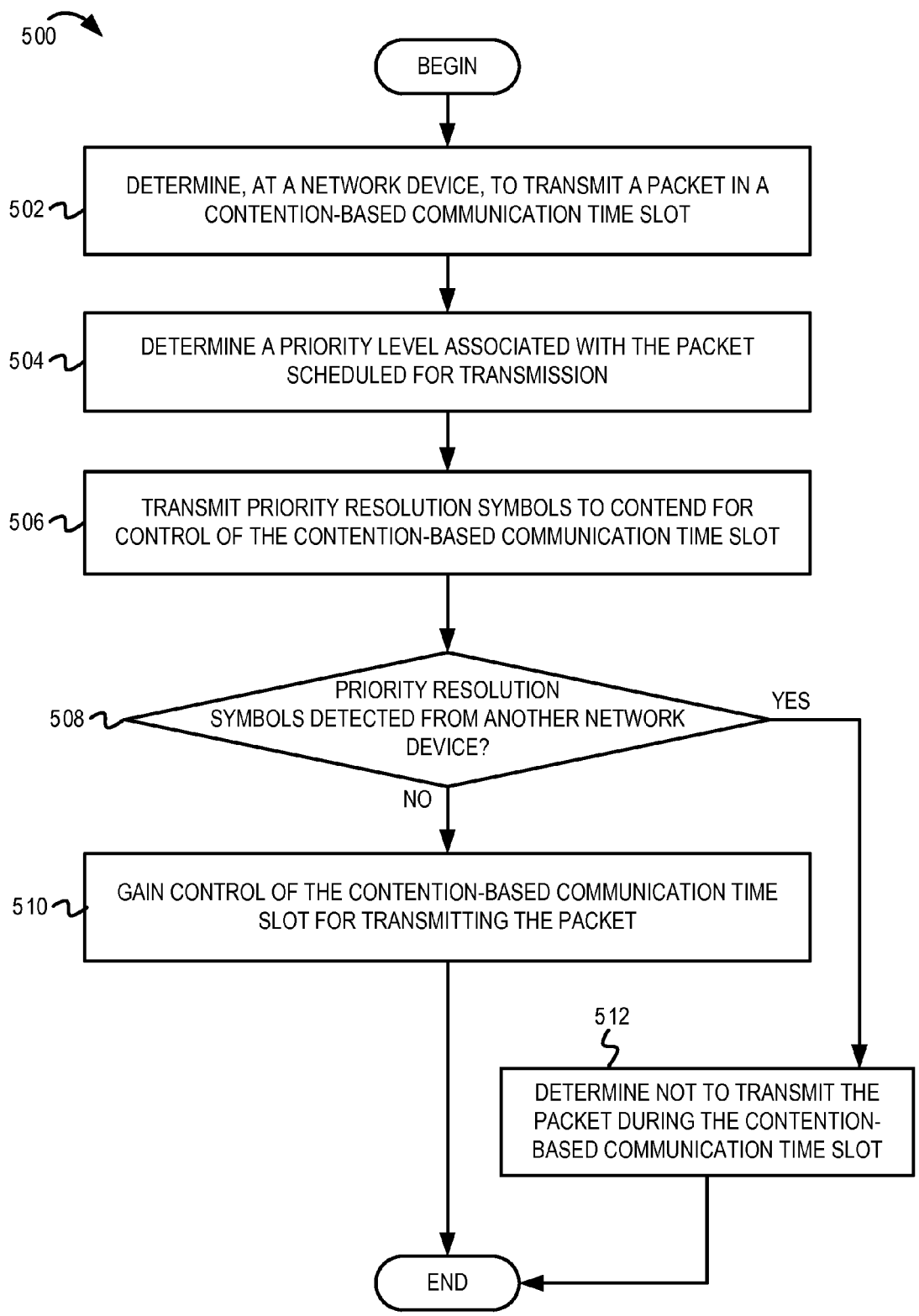
FIG. 5 is a flow diagram illustrating example operations for transmitting short packets in a contention-based communication time slot.
Figure 6:
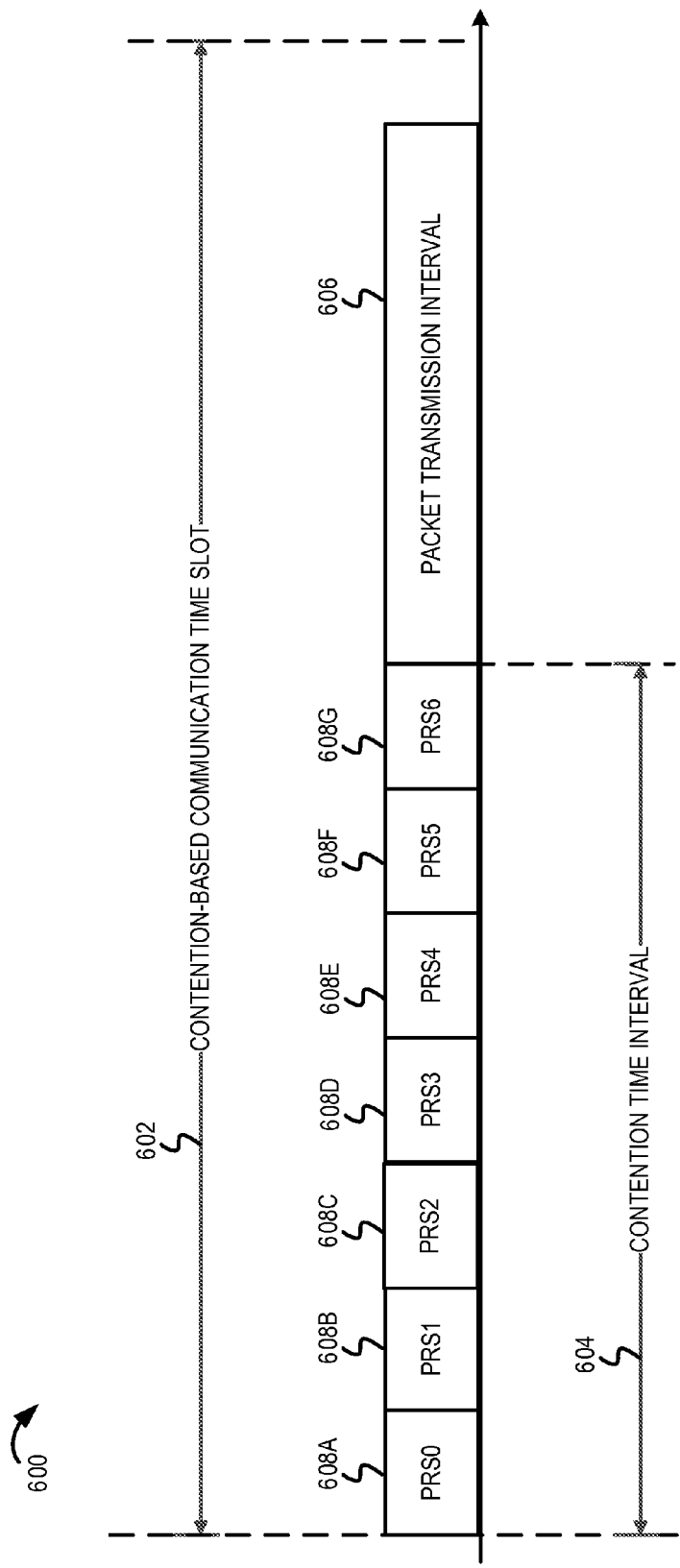
FIG. 6 is a timing diagram illustrating an example mechanism for contending for control of a contention-based communication time slot.

In addition to assigning communication time slots to network devices in the communication network 100, the master network device may also designate some of the unassigned communication time slots as "contention-based communication time slots" or "contention-based S-MAP slots." As will be further described in FIGS. 5 and 6, the contention unit 112 of the network devices 102 and 104 may contend to gain control of and transmit messages during a contention-based communication time slot. For example, the network devices may contend to gain control of the contention-based communication time slot based, at least in part, on the priority level of the packet to be transmitted. As will be further described in FIG. 7, the network devices 102 and 104 can securely exchange short packets in the communication network. For example, the packet generation unit 110 may determine the encryption key for encrypting the short packet and the initialization vector for decrypting a received short packet. The packet generation unit 110 may securely exchange short packets with other network devices (e.g., network device 104) in the communication network 100 using the encryption key and the initialization vector. In some implementations, the network device 104 may be configured as a repeater network device. The repeater network device may retransmit a short packet received from the network device 102 during a subsequent communication time slot assigned to the network device 102 to improve transmission reliability, as will be further described in FIGS. 8 and 9.

The transceiver 108 of network device 102 may include a receiver and a transmitter. The receiver can include an analog front end, including an amplifier to amplify received signals, a filter to remove unwanted frequencies from the received signals, a mixer to down-convert the received signal, an automatic gain control (AGC) module, and/or an analog-to-digital converter (ADC). The receiver may also include a fast Fourier transform (FFT) module to convert the received signal from a time domain representation to a frequency domain representation. The receiver may also include a decryption and decoding module. The transmitter may include an analog front end including an amplifier to amplify signals to be transmitted, a filter to remove unwanted frequencies from the signals to be transmitted, a mixer to up-convert the signal to an appropriate transmission frequency, and/or a digital-to-analog converter (DAC). In some embodiments, the transmitter may also include an inverse fast Fourier transform (IFFT) module to convert the signal to be transmitted from a frequency domain representation to a time domain representation. In some embodiments, the transmitter may also include an encryption and encoding module. The transceiver 108 can transmit and receive short packet during one or more communication time slots assigned to the network device 102 using the S-MAP.

Figure 1B:
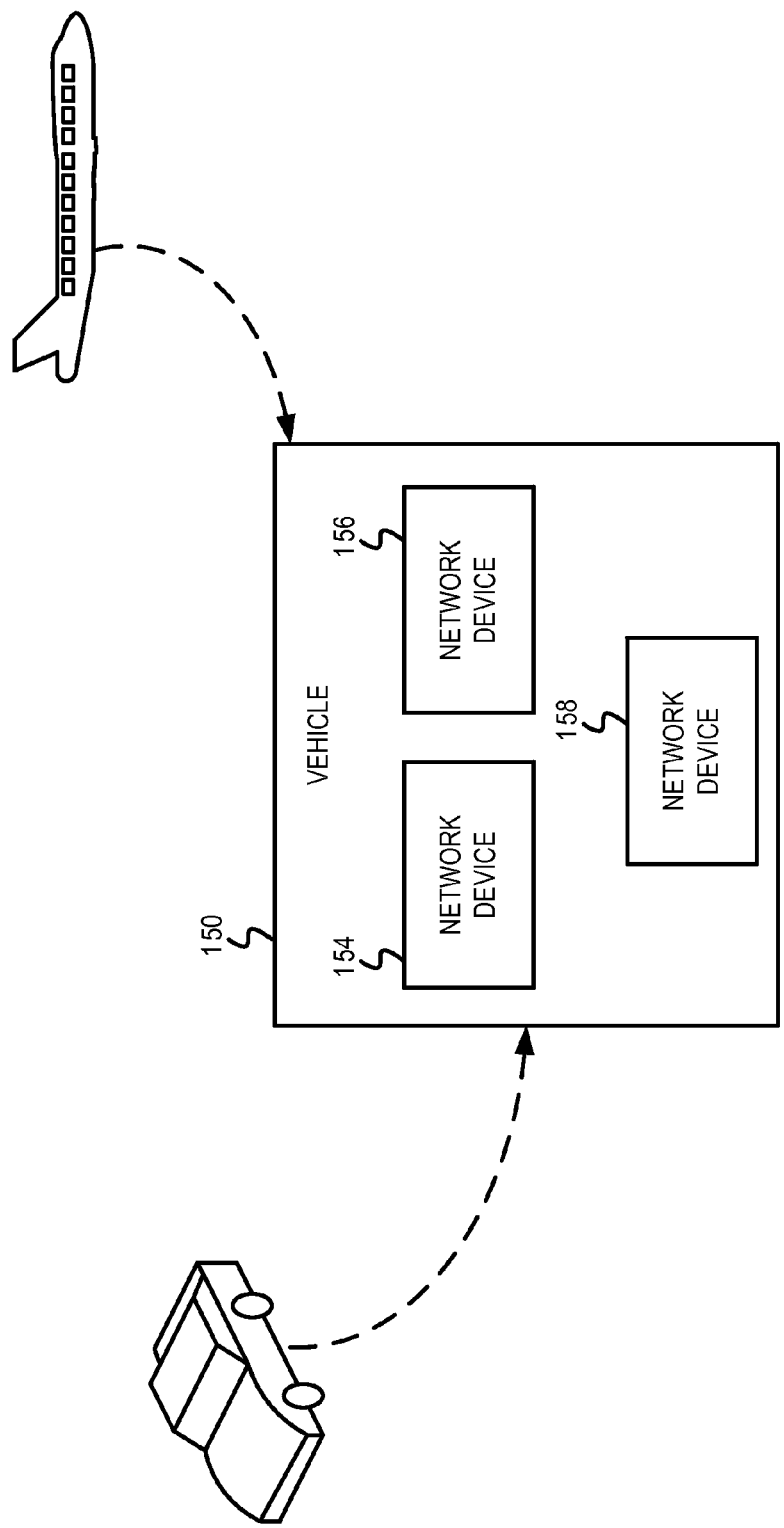
FIG. 1B is an example block diagram including a mechanism for transmitting a short packet between network devices of a vehicle.

In some embodiments, the network devices 102, 104, and 114 may be part of a common electronic system, such as a vehicle, an aircraft, machinery, or other electronic system. FIG. 1B depicts a vehicle 150 that includes network devices 154, 156, and 158. The vehicle 150 may be an electric vehicle, a plug-in electric vehicle (PEV), a hybrid electric vehicle, a gas-powered vehicle, an aircraft, etc. Although not depicted in FIG. 1B for simplicity, the network devices 154, 156, and 158 may each be configured similarly to the network device 102 of FIG. 1A. Specifically, the network devices 154, 156, and 158 may each include a scheduling unit, a transceiver, a packet generation unit, and a contention unit. In some embodiments, the network devices 154, 156, and 158 may be electronic devices/components of the communication network of the vehicle 150 (i.e., a vehicular communication network) that can implement the S-MAP for exchanging short packets within the vehicle 150. For example, the network devices 154, 156, and 158 may be the vehicle's central computer, heating and cooling system components, charging and battery system components, entertainment devices, security system components (e.g., windows, door locks, alarm, etc.), and/or other suitable electronic devices/components of the vehicle 150. The network devices 154, 156, and 158 can exchange short packets to control various operations of a vehicle, such as adjusting vehicle mirrors, opening/closing vehicle doors, controlling the entertainment devices, switching ON/OFF lights on the vehicle, etc. The network devices 154, 156, and 158 may transmit short packets during communication time slots that are assigned by a master network device (e.g., the network device 154) of the vehicle 150 using the S-MAP. As will be described below, unique communication time slots may be assigned to each network device 154, 156, and 158 using the S-MAP depending on the class of traffic that will be transmitted by the network device. Although FIG. 1B depicts the vehicle 150 including three network devices 154, 156, and 158, it is noted the vehicle 150 may include any suitable number of network devices that implement the S-MAP and exchange short packets. For example, the vehicle 150 may include various network devices that implement the S-MAP and communicate using short packets, such as the vehicle's central computer, heating and cooling system, charging and battery modules, entertainment devices, security system components (e.g., windows, door locks, alarm, etc.), and/or another suitable components/modules of the vehicle 150.

In some embodiments, the vehicle 150 may be a vehicle configured to couple with a charging station. In some implementations, the charging station may include one or more network devices configured similarly to the network device 102 of FIG. 1A. The master network devices of the vehicle and the charging station may exchange short packets for communications between the vehicle and the charging station using the S-MAP. For example, the vehicle and the charging station may exchange short packets for inter-vehicle communications and for indicating health/status information, command/control information, billing information, etc. In this example, the vehicle and the charging station may transmit short packets during assigned communication time slots using S-MAP. In this example, the network devices within the vehicle may form a first internal PLC network, such as an internal HomePlug AV network. Likewise, network devices within the charging station may form a second internal PLC network. The network devices of the vehicle and the network devices of the charging station may form a third PLC network when the vehicle is connected to (or plugged into) the charging station.

The frame format of a conventional/existing PLC packet (e.g., a HomePlug physical layer protocol data unit (PPDU)) typically includes a preamble field, a frame control field, and a payload field. In conventional PLC protocols, the frame control field may not be used to transmit application data and only the payload field may be used to transmit the application data. The predefined length of the payload field and the structure of the PLC packet may limit the efficiency of transmitting a short payload. As will be further described below, in some embodiments, the application data that will be transmitted may be referred to as a "short payload" if the length of the application data is less than a threshold length. For example, the application data may be referred to as a "short payload" if the number of bytes of the application data is less than a threshold. In one example, if the application data that will be transmitted is less than 136 bytes, the application data may be deemed a short payload. In conventional PLC protocols, the short payload is typically padded (e.g., by adding "0" bits) to yield a resultant payload that is equal to the longer predefined length of the payload field.

FIG. 2 is an example format of a short packet that may be used to transmit small amounts of application data (e.g., between 1-12 bytes). In some embodiments, as depicted in FIG. 2, short PLC packet 200 may only include a preamble field 202 and a frame control field 204 and may not include a payload field. In one example, the short PLC packet may use a short frame control field that includes a single OFDM symbol. The packet generation unit 110 of the network device 102 may generate the short PLC packet 200 to transmit application data during a communication time slot assigned to the network device 102 using S-MAP. The preamble field 202 may include a predetermined format to allow a receiving network device to detect the short PLC packet 200. The frame control field 204 may include control information 206 and application data 208. The control information 206 may include an identifier of a transmitting PLC device, an identifier of a receiving PLC device, the length of the short PLC packet 200, sequence identifiers, transmission priority, etc. The control information 206 may also include a physical layer (PHY) block size, tone map information, retransmission count, acknowledgment information, burst count, modulation type, etc. In some embodiments, in addition to the application data, the frame control field 204 may also include error detection information (e.g., a checksum, cyclic redundancy check (CRC) information, etc.). The application data 208 may be used by the network devices in a vehicle for exchanging status information, for sending control information, and for other network communications via the PLC network in the vehicle. For example, the application data 208 can be used to turn the vehicle lights on and off, check the status of sensors, control the air conditioner, etc.

The short PLC packet 200 may be a packet transmitted by a master network device or a client network device in the PLC network. In one example, the master network device and the client network device may each be network devices (or communication components) within a vehicle. In another example, the master network device may be a charging station; while the client network device may be a vehicle. In some embodiments, the short PLC packet 200 may be a local interconnect network (LIN) or a control area network (CAN) bus packet that is transmitted between communication components of the vehicle via the PLC network. In this embodiment, the master network device may be the central computer within the vehicle; while the client network devices may be the heating and cooling system, charging and battery modules, entertainment devices, security system components, etc. within the vehicle.

In some embodiments, as described above in FIG. 2, a portion of the frame control field 204 may be allocated for transmitting the control information 206 and the remaining portion of the frame control field 204 may be allocated for transmitting the application data 208. In some embodiments, the application data 208 may be transmitted in unused or reserved fields of the frame control field 204. In other embodiments, one or more fields of the frame control field 204 may be temporarily redefined to transmit the application data 208. The fields of the frame control field that are unused, reserved, or redefined may be referred to as "constituent fields" or "sub-fields." The constituent fields may include any suitable number of bits or bytes.

Figure 3:
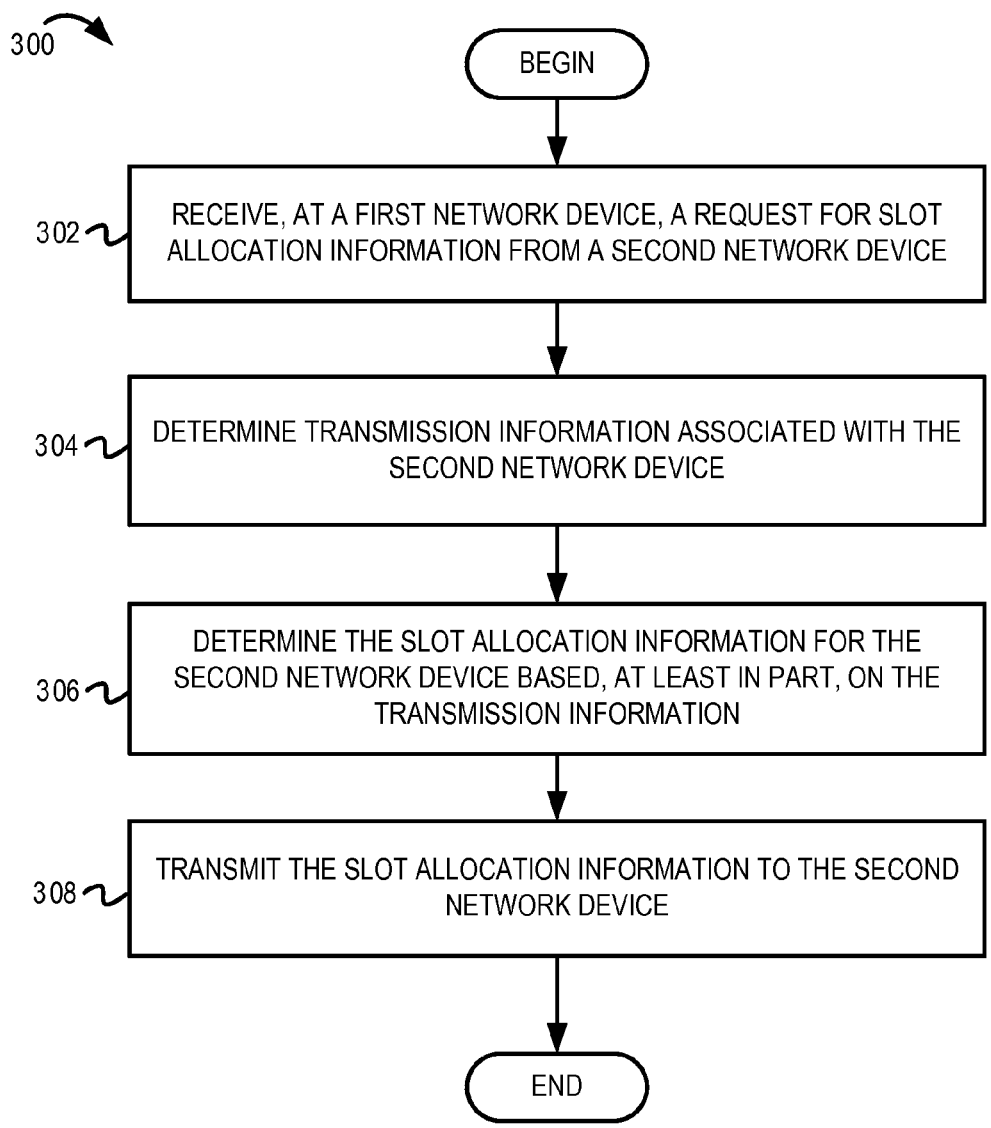
FIG. 3 is a flow diagram illustrating example operations for adaptive scheduling of communication time slots.

FIG. 3 is a flow diagram ("flow") 300 illustrating example operations for adaptive scheduling of communication time slots. The flow begins at block 302.

At block 302, a first network device receives a request for slot allocation information from a second network device. For example, a network device 104 ("client network device") may request a network device 102 ("master network device") to allocate communication time slots to the network device 104 for network communications. In another example, the network device 104 may request the network device 102 to provide the slot allocation information associated with all the network devices in the communication network. In one example, the network device 102 and the network device 104 may be electronic devices within an automobile or other type of vehicle. The network device 102 and the network device 104 may implement one or more wired and/or wireless communication protocol (e.g., a PLC protocol, WLAN protocol, and/or MOCA protocol) for intra-vehicular communications. In one example, the network device 104 may transmit the request to the network device 102 in a PLC packet (e.g., a short PLC packet). The flow continues at block 304.

At block 304, the first network device determines transmission information associated with the second network device. The request received by the network device 102 from the network device 104 may indicate the transmission information associated with the network device 104. The transmission information may include the class of traffic ("traffic class") that will be transmitted by the second network device, the number of packets of each traffic class that will be transmitted by the second network device, the type of packets that will be transmitted by the second network device, the periodicity (if any) of the packets, etc. The type of packet may refer to the content of the packet, such as whether the packet is a heating and cooling system control and/or status packet, charging and battery control and/or status packet, entertainment device control and/or status packet, security system control and/or status packet, etc. In one embodiment, traffic exchanged in the communication network 100 may be divided into three traffic classes—traffic class A, traffic class B, and traffic class C. A packet that belongs to traffic class A ("class A packet") may have a 10 ms period (also referred to as cycle time or inter-packet arrival time) and a 2 ms latency. In other words, the class A packet may be generated every 10 ms. The time difference between generating the class A packet and transmitting the class A packet may be specified as less than or equal to 2 ms. A packet that belongs to traffic class B ("class B packet") may have a 50 ms period and a 10 ms latency. A packet that belongs to traffic class C ("class C packet") may have a 20 ms period and a 100 ms latency. In other embodiments, however, the traffic exchanged in the communication network may be divided into any suitable number of traffic classes. Each of the traffic classes may have any suitable type of period and/or latency specifications. The flow continues at block 306.

Figure 4A:
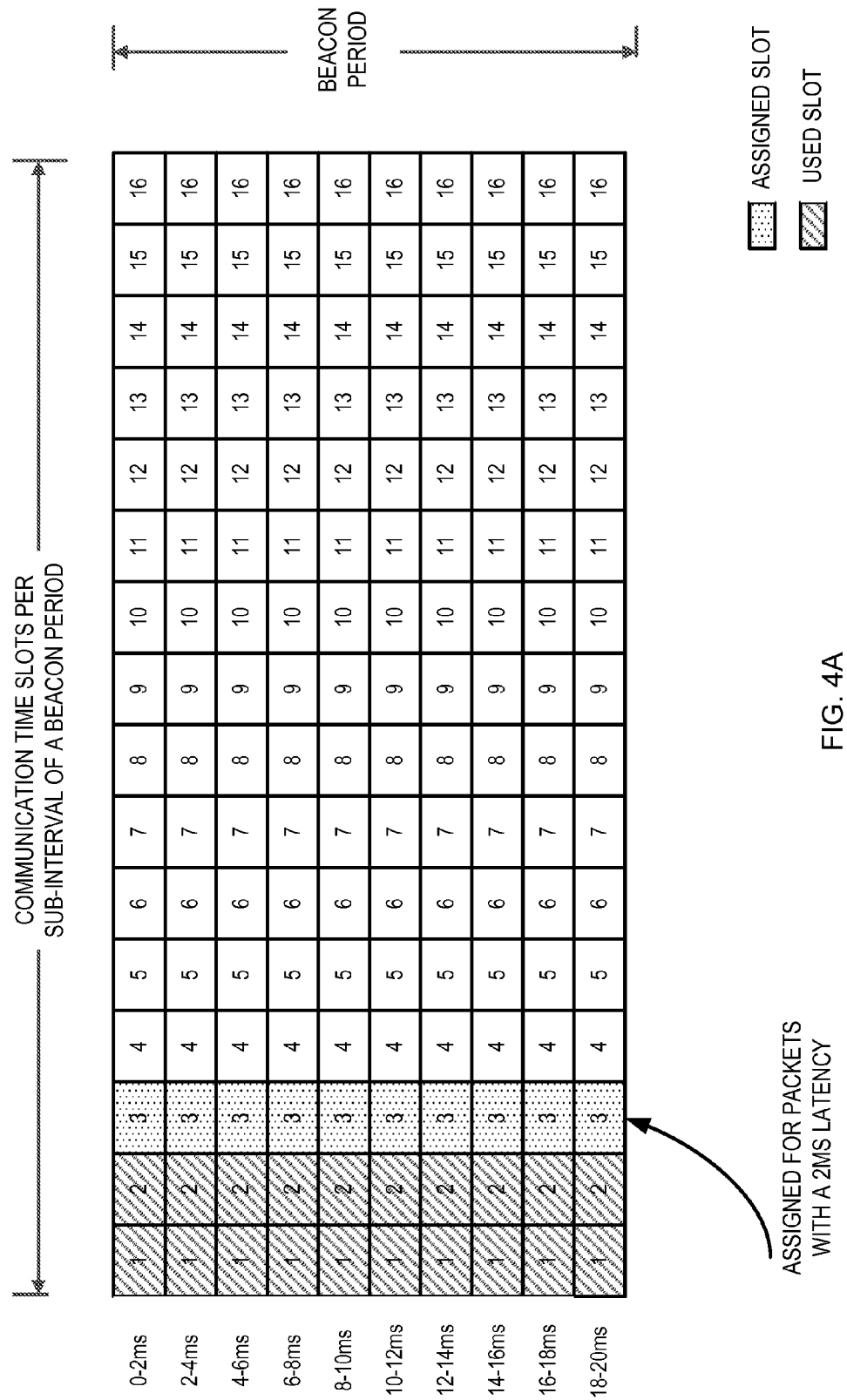
FIG. 4A is an example slot allocation table for allocating communication time slots for transmitting low latency packets.
Figure 4B:
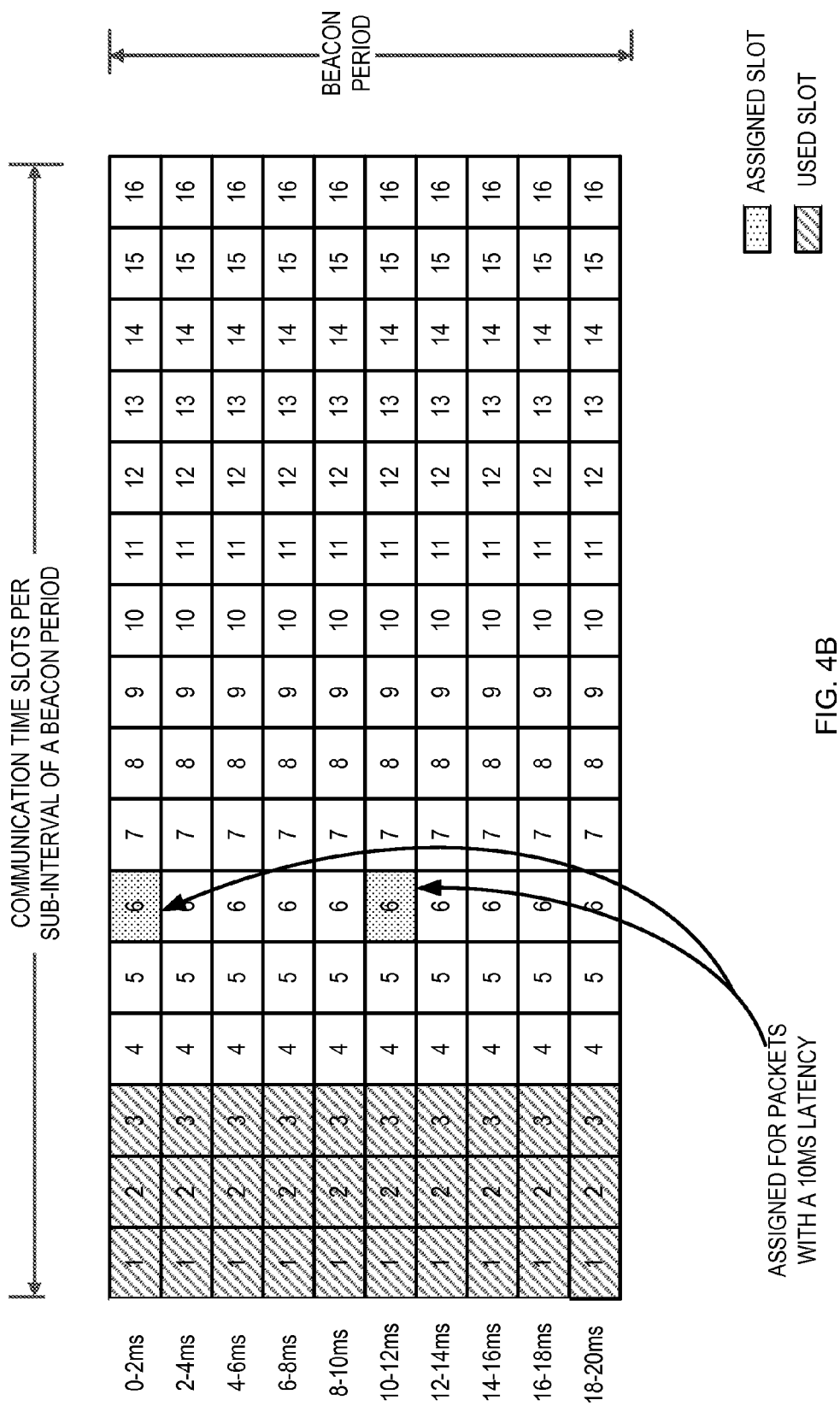
FIG. 4B is an example slot allocation table for allocating communication time slots for transmitting intermediate latency packets.

At block 306, the first network device determines the slot allocation information for the second network device based, at least in part, on the transmission information. For example, the scheduling unit 106 of the network device 102 may determine the slot allocation information for the network device 104 to implement the S-MAP. In one embodiment, the network device 102 may assign communication time slots to the network device 104 depending on the traffic class that will be transmitted by the network device 104. The network device 102 may assign communication time slots to the network device 104 and other network devices in the communication network 100 using slot allocation tables. In one example, the slot allocation tables can be used to implement the S-MAP in the communication network 100. Example slot allocation tables for scheduling class A, class B, and class C packets are depicted in FIGS. 4A, 4B, and 4C respectively. In some implementations, the communication time slots may be allocated based on either the latency specifications or the time cycle (i.e., period) specifications. For example, the communication time slots may be allocated based on the shorter of the latency specifications or the time cycle specification. In one example, as will be depicted in FIGS. 4A-4C, the communication time slots for transmitting class A and class B packets may be allocated based on the latency specifications (e.g., latency of 2 ms and 10 ms respectively). The communication time slots for transmitting class C packets may be allocated based on the time cycle specifications (e.g., period of 20 ms). FIGS. 4A-4C depict a graph of time sub-intervals within a beacon period (Y-axis) versus time slots per sub-interval (X-axis). In the examples depicted in FIGS. 4A-4C, the beacon period is 20 ms and each beacon period is divided into ten 2 ms sub-intervals (depicted on the Y-axis). In the example of FIGS. 4A-4C, each communication time slot is 125 μs and each sub-interval is divided into 16 communication time slots (depicted on the X-axis). It is noted that in other embodiments, the beacon period, the sub-intervals, and/or the communication time slots may have other suitable durations.

In the example of FIG. 4A, the maximum allowable latency for a class A packet may be 2 ms. Therefore, the first network device may assign a communication time slot to the second network device every 2 ms if the second network device is scheduled to transmit class A packets. In the example of FIG. 4A, the first network device (e.g., the master network device) has already allocated communication time slots 1 and 2 of each sub-interval of the beacon period. The previously allocated communication time slots are represented using hatched blocks. The first network device may allocate communication time slot 3 of each sub-interval of the beacon period to the second network device in response to determining that the second network device will transmit class A packets. The current allocated communication time slots are represented using dotted blocks. Thus, for a 20 ms beacon period and a 2 ms packet transmission latency, the scheduling unit 106 may allocate ten communication time slots to the second network device per beacon period.

In the example of FIG. 4B, the maximum allowable latency for a class B packet may be 10 ms. Therefore, the first network device may assign a communication time slot to the second network device every 10 ms if the second network device is scheduled to transmit class B packets. In the example of FIG. 4B, the first network device (e.g., the master network device) has already allocated communication time slots 1, 2, and 3 of each sub-interval of the beacon period. The first network device may allocate communication time slot 6 in the 0-2 ms and the 10-12 ms sub-intervals of the beacon period to the second network device in response to determining that the second network device will transmit class B packets. Thus, for a 20 ms beacon period and a 10 ms packet transmission latency, the scheduling unit 106 may allocate two communication time slots to the second network device per beacon period.

In the example of FIG. 4C, the maximum allowable latency for a class C packet may be 100 ms; however, the class C packets may be transmitted every 20 ms. Therefore, the first network device may assign a communication time slot to the second network device every 20 ms if the second network device is scheduled to transmit class C packets. In the example of FIG. 4C, the first network device has already allocated communication time slots 1, 2, and 3 of each sub-interval of the beacon period and slot 6 in a few sub-intervals of the beacon period. The first network device may allocate slot 15 in the 2-4 ms sub-interval of the beacon period to the second network device in response to determining that the second network device will transmit class C packets. Thus, for a 20 ms beacon period and a 20 ms packet transmission latency, the scheduling unit 106 may allocate one communication time slot to the second network device per beacon period.

In some embodiments, the first network device may be configured to reserve communication time slots in anticipation of future requests from client network devices to transmit low latency packets. In the example of FIG. 4B, the first network device may reserve communication time slots 4 and 5 of each sub-interval of the beacon period in anticipation that another network device may request communication time slots to transmit class A packets. The number of communication time slots that are reserved for future low latency packets may be predefined and configurable. In other embodiments, however, the first network device may also update the slot allocations to accommodate low latency packets. For example, if communication time slot 3 was previously allocated for higher latency packets (e.g., class B or class C packets), the master network device may adaptively re-assign communication time slot 3 to the second network device for transmitting class A packets and assign other communication time slots (e.g., depicted in FIGS. 4B and 4C) for the class B or class C packets. After determining slot allocation information for the second network device, the flow continues at block 308.

At block 308, the first network device transmits the slot allocation information to the second network device. For example, the scheduling unit 106 may transmit the slot allocation information to the network device 104. In some embodiments, the first network device may transmit the slot allocation information associated with the second network device in a unicast packet to the second network device. As described above, the slot allocation information associated with the second network device may indicate the communication time slots allocated to the second network device for each traffic class. For example, the slot allocation information can indicate to the second network device a communication time slot during which the second network device can transmit a packet of a specific traffic class (e.g., a class B packet). In addition, the slot allocation information may also indicate the communication time slots during which the second network device should listen for and receive transmissions from other network devices. This can enable the second network device to conserve power by operating in a power save mode (or a low-power operating mode) during the remaining communication time slots. In some embodiments, the first network device may also allocate communication time slots to the second network device and to other network devices of the communication network 100 to optimize the amount of time each network device operates in the power save mode and to maximize power saving.

In some embodiments, the first network device may transmit the slot allocation information for each network device in the communication network 100 to the second network device. For example, the first network device may broadcast the slot allocation information to all of the network devices in the communication network 100. As described above, the slot allocation information associated with all the network devices in the communication network 100 may be collectively represented in a slot allocation table. The slot allocation table may indicate communication time slots allocated to each network device, the traffic class that will be transmitted in each communication time slot (e.g., whether traffic class A, B, or C), and so on. In some embodiments, the slot allocation table may also include the type of packet that will be transmitted in the communication time slot (e.g., whether a door lock/unlock packet, light activation packet, etc.). In some embodiments, the first network device may transmit the slot allocation table in a beacon message. In another embodiment, the first network device may transmit the slot allocation table in a broadcast management message. The second network device may use the slot allocation table determine when to initiate its transmissions and when to listen for transmissions from other network devices.

In some embodiments, the second network device may also use the slot allocation table to determine when to operate in a power save mode to conserve power and battery life. During the power save mode, the second network device may disable processing and/or communication components or configure the processing and/or communication components in a low-power operating mode. The second network device may operate in the power save mode during unassigned communication time slots (e.g., communication time slots that have not been assigned to any network device). The second network device may also use the slot allocation table to determine whether it can operate in the power save mode during one or more assigned communication time slots. The slot allocation table may indicate the communication time slots during which the second network device should listen for transmissions from other network devices (and therefore remain in a normal or active operating mode). The slot allocation table may also indicate which communication time slots it can ignore and should not listen for transmission from other network devices (and therefore enter the power save mode). For example, the second network device may operate in the power save mode in a communication time slot if the second network device is not configured to receive or process the traffic class or the type of packets that will be transmitted in the communication time slot. For example, if the second network device is not configured to receive entertainment device packets, the second network device may operate in the power save mode during the communication time slots that are allocated for receiving entertainment device packets. In another example, if the second network device is only configured to receive door lock/unlock packets, the second network device may listen for packets during the communication time slot assigned for door lock/unlock packets and may operate in the power save mode during the other communication time slots. From block 308, the flow ends.

FIGS. 4A, 4B, and 4C depict the master network device (e.g., first network device) allocating communication time slots of the beacon period to the second network device. The master network device may assign a communication time slot to the second network device depending on the communication time slots previously assigned by the master network device. For example, the master network device may allocate communication time slot 4 in each sub-interval of the beacon period for transmitting class A packets. In another example, the master network device may allocate slot 6 of the 4-6 ms sub-interval of the beacon period for transmitting class C packets.

As described above, FIG. 3 describes the first network device receiving a request for slot allocation information from the second network device. In other embodiments, the master network device (e.g., the first network device) may monitor the network devices in the communication network 100 and determine the traffic classes that each network device will transmit. In some embodiments, the master network device may poll each network device to determine the traffic classes that will be transmitted by the network device. The master network device may then generate the slot allocation table indicating communication time slots that are assigned to each network device for transmitting packets that belong to a specific traffic class. In some embodiments, the master network device may allocate communication time slots on a per-device basis. For example, the master network device may initially allocate communication time slots to the second network device, then to a third network device, and so on. In another embodiment, the master network device may allocate communication time slots on a per-traffic class basis. For example, the master network device may first allocate communication time slots to network devices for transmitting low latency packets (e.g., class A packets). The master network device may then allocate communication time slots to network devices for transmitting intermediate latency packets (e.g., class B packets), and so on. The master network device may then broadcast the slot allocation table to the network devices in the communication network 100.

The master network device may monitor and detect changes to the configuration of the communication network changes, such as a new network device added to the communication network, a network device removed from the communication network, etc. In response to detecting the change, the master network device may poll the network devices again to determine the traffic classes that each network device will transmit. The master network device may then generate an updated slot allocation table. It is noted, however, that in other embodiments, a user may manually assign communication time slots to each network device (e.g., based on the traffic class that will be transmitted by each network device).

In other embodiments, each network device in the communication network may initiate a communication with the master network device (e.g., the first network device) to register itself with the master network device. After joining the communication network, the client network device (e.g., the second network device) may transmit a notification to the master network device indicating its presence in the communication network and indicating the transmission information associated with the client network device (e.g., the transmission information described above in block 304 of FIG. 3). For example, the client network device may indicate the types of packets and traffic classes that will be transmitted by the client network device. The client network device may also indicate a transmission schedule (if known), retransmission specifications, etc. The master network device may allocate unique communication time slots to the client network device for transmitting packets that belong to a specific traffic class. In some embodiments, if the configuration of the client network device changes, the client network device may automatically notify the master network device of the change in configuration and request updated slot allocation information. In other embodiments, the master network device may monitor and detect changes to the configuration of the client network device and provide updated slot allocation information if needed.

In some embodiments, each network device may be configured to retransmit the packet multiple times to improve transmission reliability. For example, the network device 102 may be configured to transmit a packet during a communication time slot and then retransmit (or repeat) the packet during two subsequent communication time slots. In some embodiments, the master network device may allocate communication time slots specifically for retransmitting packets in the communication network. For example, the master network device may assign communication time slot 3 in each sub-interval of the beacon period to a client network device for transmitting class A packets. The master network device may assign communication time slots 4 and 5 in each sub-interval of the beacon period for retransmitting the packets. In another embodiment, the master network device may assign the same communication time slots for the initial transmission and subsequent retransmissions of a packet. Referring to the example of FIG. 4A, the client network device may use the assigned communication time slot 3 during the 0-2 ms sub-interval for an initial transmission of a packet and communication time slot 3 during N subsequent sub-intervals for retransmitting the packet.

In some embodiments, the number of times a network device retransmits the packet may depend on the traffic class of the packet and the number of communication time slots assigned to the network device. In one example, the class A and B packets may be retransmitted four times and the class C packet may be retransmitted once. In other embodiments, packets that belong to different traffic classes may be retransmitted any suitable number of times. In another embodiment, the number of times that the packet is retransmitted may depend on the type of packet. For example, a first type of packet may be retransmitted a greater number of times than a second type of packet because the first type of packet has a higher priority than the second type of packet. For example, ignition start/stop packets may be retransmitted a greater number of times as compared to packets for switching ON/OFF lights. In some embodiments, the network device may retransmit a previous transmitted packet along with a current retransmission packet. As described above, in some embodiments, a 32-byte HomePlug AV frame control field of a short packet may be used to transmit two 16-byte constituent packets. In this embodiment, a retransmission of the previous packet may be included as one 16-byte constituent packet of the 32-byte HomePlug AV frame control field. The retransmission packet (e.g., the current packet) may be included as the other 16-byte constituent packet of the 32-byte HomePlug AV frame control field. The network device may transmit or retransmit a greater number of constituent packets if the short packet includes a longer frame control field length or if the constituent packets have a shorter frame control field length. For example, a 64-byte frame control field may be used to transmit four 16-byte constituent packets. In another example, a 64-byte frame control field may be used to transmit eight 8-byte constituent packets. It is noted that the number of times the network device retransmits the packet may also be dependent upon other factors, such as the channel conditions (e.g., noise) between the network device and the receiving network device(s).

Although FIGS. 4A-4C do not depict slot allocation for transmitting beacon messages, the master network device may allocate a suitable number of communication time slots per beacon period for transmitting the beacon message. The number of communication time slot that are allocated for transmitting the beacon message may depend on the transmission modulation that is used to transmit the beacon message. For example, the master network device may assign four communication time slots to transmit a beacon message using the HomePlug AV mini-ROBO transmission modulation. In another example, the master network device may assign one communication time slot to transmit a beacon message using the frame control transmission modulation. In some embodiments, the master network device may first assign the communication time slots for transmitting the beacon message and may assign the remaining communication time slots to the other network devices. In other embodiments, the master network device may first assign the communication time slots to the other network devices for transmitting their respective messages. The master network device may then assign one or more of the remaining communication time slots for transmitting the beacon message. It is noted that the beacon message need not be transmitted at the beginning of each beacon period (e.g., during the first communication time slot of each beacon period). Instead, the beacon message may be transmitted during any communication time slot of the beacon period. However, the beacon message may be transmitted during the same communication time slot from one beacon period to the next.

In some embodiments, the slot allocation table may be static or quasi-static. For example, the master network device of a vehicle may allocate communication time slots for other network devices of the vehicle when scheduled maintenance operations are performed on the vehicle. In another example, the master network device may allocate communication time slots for other network devices when testing or diagnostic operations are performed on the vehicle. In another example, the master network device may allocate communication time slots for other network devices when testing or diagnostic operations are performed on the vehicle. In another example, the master network device may allocate communication time slots for other network devices based on manufacturer specifications. In another example, a user may manually allocate the communication time slots to each network device of the vehicle. The master network device may re-execute operations for slot allocation if a network device is added or removed from the communication network, if the configuration of a network device changes, etc. For example, the master network device of the vehicle may re-execute operations for slot allocation if the configuration of the vehicle changes, if a new component/feature is added to the vehicle, if an existing component/feature is removed from the vehicle, etc. In another embodiment, the master network device may periodically re-execute operations for slot allocation (e.g., every X hours, every Y days, etc.).

In some embodiments, each network device may be configured to transmit only one class of traffic. In other embodiments, a network device may be configured to transmit multiple classes of traffic. For example, the network device 104 may be configured to transmit both class A and class B packets. In some embodiments, the master network device may allocate distinct sets of communication time slots to enable the network device 104 to transmit the class A and class B packets. For example, the network device 102 may indicate (e.g., in the slot allocation table) that the network device 104 should use communication time slot 3 of each sub-interval for transmitting class A packets and communication time slot 6 in the 0-2 ms and the 10-12 ms sub-intervals for transmitting class B packets. In another embodiment, the network device 102 may allocate one set of communication time slots for transmitting both class A and class B packets. For example, the network device 102 may indicate (e.g., in the slot allocation table) that the network device 104 should use communication time slot 3 of each sub-interval for transmitting either class A or class B packets. The scheduling unit of the network device 104 may execute scheduling operations to transmit available packets while meeting the latency specifications of the available packets.

FIGS. 3-4C describe the master network device allocating multiple communication time slots to the client network device based on the latency specifications of the packets. In other embodiments, if the client network device transmits packets periodically and has a predetermined schedule for transmitting the packets, the master network device may allocate communication time slots based on the predetermined schedule. For example, referring to FIG. 4A, the client network device may be programmed to transmit a packet during communication time slot 3 of the 0-2 ms sub-interval and to retransmit the packet twice for reliability. In this example, the first network device may only assign three communication time slots to the client network device (e.g., communication time slot 3 of the 0-2 ms, 2-4 ms, and 4-6 ms sub-intervals of each beacon period).

In some embodiments, certain types of packets may be rarely transmitted in the communication network. For example, door lock/unlock packets, ignition start/stop packets, etc. may be rarely transmitted in the communication network. Accordingly, the master network device may designate some communication time slots as contention-based communication time slots for transmitting these infrequent packets. The network devices 102, 104, and 114 may execute a contention-based mechanism for gaining control of a contention-based communication time slot and for determining which network device should transmit during the contention-based communication time slot, as will be further described in FIGS. 5 and 6.

FIG. 5 is a flow diagram 500 illustrating example operations for transmitting short packets in a contention-based communication time slot. The flow begins at block 502.

At block 502, a network device of a communication network determines to transmit a packet in a contention-based communication time slot. The network device may identify the contention-based communication time slot based, at least in part, on a slot allocation table received from a master network device. As described above, the slot allocation table may indicate the communication time slots that are assigned to each network device for transmitting a certain traffic class and/or for transmitting a certain type of packet. Additionally, in some embodiments, the slot allocation table may also indicate the contention-based communication time slots. The contention-based communication time slots may not be allocated to a single network device. Instead, multiple network devices may contend for control of the contention-based communication time slot and the ability to transmit a packet during the contention-based communication time slot. In some embodiments, the master network device may specifically designate one or more communication time slots as contention-based communication time slots. In other embodiments, any communication time slots that were not assigned to network devices may automatically be designated as contention-based communication time slots. The flow continues at block 504.

At block 504, the network device determines a priority level associated with the packet scheduled for transmission. For example, the contention unit 112 may determine the priority level associated with the packet. Network devices that are contending to transmit packets during the contention-based communication time slot may implement priority contention using priority resolution symbols to determine the packet with the highest priority level. In one embodiment, the priority level of the packet may be represented as a 7-bit binary number. In this example, there may be $2^7=128$ unique priority levels that be assigned to different types of packets. In other embodiments, the priority level of the packet may be represented using any suitable number of bits. The number of bits that are used to represent the priority level of the packet may be determined based, at least in part, on the number of priority resolution symbol signaling slots in the contention-based communication time slot, as will be further described below. In some embodiments, the master network device may provide priority information to the network devices. In one example, the master network device may assign priority levels to different packets that can be scheduled for transmission based on the type of packet, the type of network device that is transmitting the packet, the traffic class associated with the packet, and/or other factors. The master network device may then transmit (e.g., broadcast) the priority information to the network device that indicates the priority levels that are assigned to the different types of packets. In another example, the master network device can provide to the network devices an algorithm that the network devices can use to determine the priority level of packets. For example, the algorithm can determine the priority levels of packets based on the type of packet, the type of network device that is transmitting the packet, the traffic class associated with the packet, and/or other factors. The flow continues at block 506.

At block 506, the network device transmits priority resolution symbols (PRS) to contend for control of the contention-based communication time slot. For example, the contention unit 112 may transmit the priority resolution symbols to contend for control of the contention-based communication time slot. As depicted in FIG. 6, contention-based communication time slot 602 may be divided into a contention time interval 604 and a packet transmission interval 606. The contention time interval 604 may be further sub-divided into PRS signaling slots—one PRS signaling slot for transmitting each priority resolution symbol. In one example, the priority of the packet may be represented using seven priority resolution symbols (or a 7-bit binary number). Accordingly, as shown in FIG. 6, the contention time interval 604 is sub-divided into seven PRS signaling slots 608A-608G for transmitting priority resolution symbols PRS0-PRS6 respectively. In one example, the duration of the contention-based communication time slot may be 375 μs and the duration of each PRS signaling slot may be 35.84 μs. In other examples, however, the contention-based communication time slot and the PRS signaling slots may have another suitable duration. Additionally, the contention-based communication time slot may include any suitable number of PRS signaling slots. In one embodiment, the number of the PRS signaling slots may depend on how many types of packets will be transmitted in the communication network to ensure that each type of packet is assigned a unique priority level. The number of PRS signaling slots implemented by S-MAP may exceed the number of PRS signaling slots implemented by existing PLC protocols (e.g., 2 PRS signaling slots in the existing PLC protocols). The network device may transmit a predefined signal in the PRS signaling slot when the corresponding priority resolution symbol has a value=1. The network device may not transmit the predefined signal in the PRS signaling slot when the corresponding priority resolution symbol has a value=0. The network device may listen for signals transmitted by other network devices when the network device does not transmit the predefined signal in the PRS signaling slot. For example, if the priority of the packet is represented by PRS0–PRS6=0111001, the network device may transmit the predefined signal during PRS signaling slots 608B, 608C, 608D, and 608G (e.g., when PRS1, PRS2, PRS3, and PRS6 have a value=1). The network device may listen for transmissions from other network devices during PRS signaling slots 608A, 608E, and 608F (e.g., when PRS0, PRS4, and PRS5 have a value=0). The flow continues at block 508.

At block 508, the network device determines whether priority resolution symbols were detected from another network device. For example, the contention unit 112 may determine whether another network device should gain control of the contention-based communication time slot based, at least in part, on whether priority resolution symbols were detected from another network device. Referring to the above example, the network device may determine whether the predefined signal was detected during the PRS signaling slots 608A, 608E, and 608F (e.g., when PRS0, PRS4, and PRS5 have a value=0). If the network device detected the predefined signal during the PRS signaling slot 608A, 608E, or 608F, the network device may determine that the transmission of another network device has a higher priority. If the priority resolution symbols were not detected from another network device, the flow continues at block 510. Otherwise, if priority resolution symbols were detected from another network device, the flow continues at block 512. Although not depicted in FIG. 5, it is noted that, the network device may stop the contention process if the network device detects a PRS signal during a PRS signaling slot of the contention time interval. Referring to the above example, if the network device detected a PRS signal in PRS signaling slot 608A, the network device will lose contention and will not transmit during subsequent PRS signaling slots 608B, 608C, 608D, and 608G (even though PRS1, PRS2, PRS3, and PRS6 have a value=1).

At block 510, the network device gains control of the contention-based communication time slot for transmitting the packet. In response to determining that priority resolution symbols were not detected from another network device, the network device can determine that the packet has the highest priority level compared to pending transmissions from other network devices. After gaining control of the contention-based communication time slot 602, the network device may transmit the packet during the packet transmission interval 606. From block 510, the flow ends.

At block 512, the first network device determines not to transmit the packet during the contention-based communication time slot. In response to determining that priority resolution symbols were detected from another network device, the network device can determine that the packet has a lower priority level compared to a pending transmission from another network device. Accordingly, the network device may defer transmitting the packet in the communication network. The network device may relinquish control of the contention-based communication time slot to another network device with a higher priority level. The network device may then contend for control of a different contention-based communication time slot to transmit the packet in the communication network. From block 512, the flow ends.

In some embodiments, the number of PRS signaling slots and consequently the number of bits that are used to represent the priority level of a packet may depend on how many types of packets will be transmitted in the communication network. This can ensure that each type of packet is assigned a unique priority level and can help avoid packet collisions. For example, a door lock/unlock packet may be assigned a first priority level, an ignition start/stop packet may be assigned a second priority level, a light activation packet may be assigned a third priority level, and so on. However, in other embodiments, the number of PRS signaling slots and consequently the number of bits that are used to represent the priority level of a packet may be less than the number of types of packets that will be transmitted in the communication network. In this embodiment, each type of packet may be classified into a packet group depending on the purpose/type of the packet. For example, packets that are transmitted for door lock/unlock operations and window open/close operations may be grouped into a first packet group (e.g., the security devices group). Packets that are transmitted for switching ON/OFF lights inside or on the vehicle may be grouped into a second packet group (e.g., the lighting devices group), and so on.

In some embodiments, each contention-based communication time slot may be assigned to one or more packet groups. For example, if the contention-based communication time slot is assigned to the first packet group, only the network devices that are scheduled to transmit packets that belong to the first packet group may contend for control of the contention-based communication time. Thus, only the network devices that are scheduled to transmit door lock/unlock packets or window open/close packets may contend for control of the contention-based communication time slot. Other network devices that are not scheduled to transmit packets that belong to the first packet group may not contend for control of the contention-based communication time slot. Classifying different types of packets into different packet groups and assigning different packet groups to different contention-based communication time slots can also enable priority levels to be reused. For example, the door lock/unlock packets in the first packet group may be assigned the same priority level as a headlight switch ON/OFF packet in the second packet group. However, by assigning different contention-based communication time slots to the first and the second packet groups, collisions between the two types of packets can be avoided. In this embodiment, the slot allocation table may indicate packet group(s) assigned to each contention-based communication time slot.

In some embodiments, instead of classifying packets into a packet group depending on the type of the packet, network devices in the communication network may be classified into different device groups. Collision-free contention-based transmission may be achieved by assigning a unique priority level to each network device within a particular device group. In some embodiments, the master network device may assign priority levels to different network devices within a device group. The master device may then provide (e.g., broadcast) to the network devices the priority information that indicates the priority levels of the different network devices within each of the device groups. Furthermore, a device group may only contend for control of the assigned contention-based communication time slot. In one embodiment, network devices may be classified into an appropriate device group depending on the traffic class and/or type of packets that will be transmitted by the network device. For example, network devices that transmit entertainment device control and/or status packets may be grouped into a first device class. If a first contention-based communication time slot is allocated to the first device class, only the devices that belong to the first device class may contend for control of the first contention-based communication time slot. The other network devices that are not configured to transmit entertainment device control and/or status packets may not attempt to gain control of the first contention-based communication time slot. In another embodiment, network devices may be classified into an appropriate device group depending on the communication capabilities of the network devices. For example, network devices that are only configured to transmit short packets in the frame control field may be classified into one device group.

In some embodiments, a network device may be assigned to different device groups. The network device may be assigned a different priority level for each device group. For example, if the network device is configured to transmit both class A and class B packets, the network device may be assigned to a first device group for network devices that transmit class A traffic and a second device group for network devices that transmit class B traffic. A first set of contention-based communication time slots may be allocated to the first device group and a second set of contention-based communication time slots may be allocated to the second device group. Additionally, the network device may be have a first priority level for the first device group and a second priority level for the second device group. The network device may use the corresponding priority level to contend for control of the appropriate contention-based communication time slot depending on the traffic class of the packets that will be transmitted.

In some embodiments, unencrypted packets that are transmitted over the vehicular electric wiring may be detected by sniffing packets on the electric wiring (e.g., using power outlets in the vehicle). To provide security, the packets that are transmitted over the vehicular electric wiring may be encrypted. The mechanisms for providing security of packets transmitted over a PLC network may include an encryption mechanism, a mechanism for distributing an encryption key to network devices in the PLC network, and mechanism for decrypting encrypted packets (e.g., using an initialization vector). These and other operations for securely exchanging packets will be described in FIG. 7.

Figure 7:
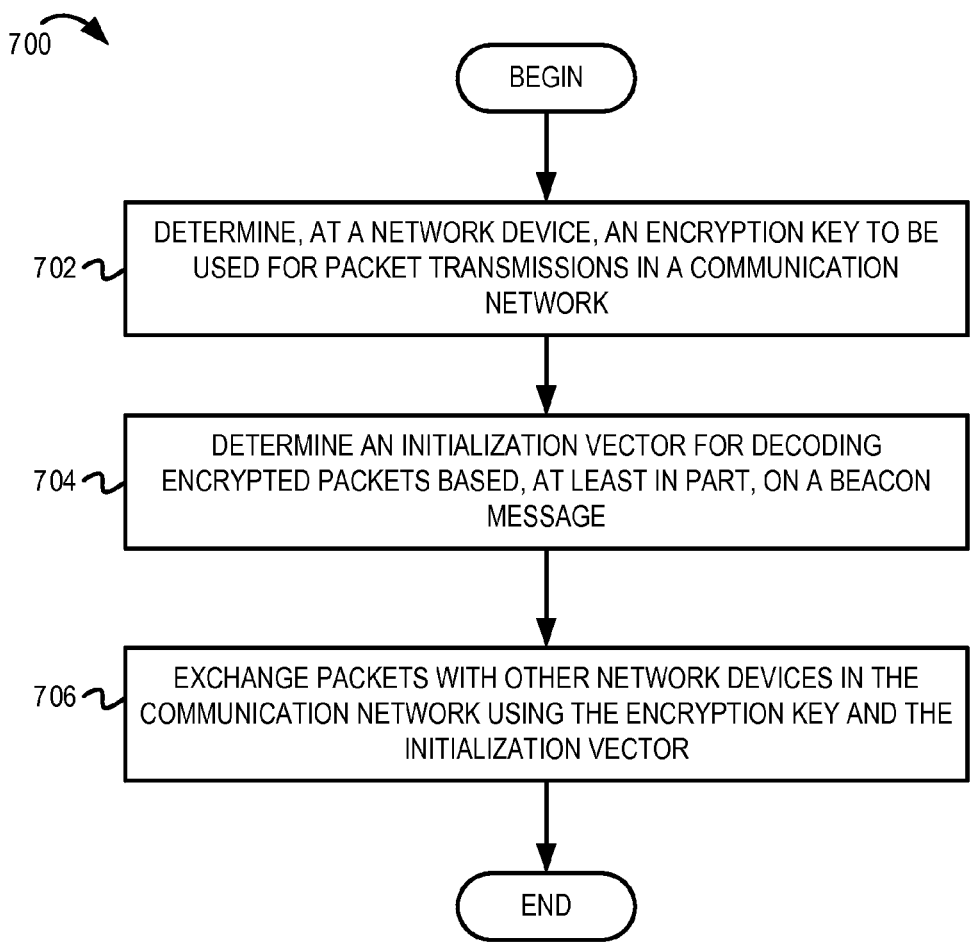
FIG. 7 is a flow diagram illustrating example operations for securely exchanging a short packet in a communication network.

FIG. 7 is a flow diagram 700 illustrating example operations for securely exchanging short packets in a communication network. The flow begins at block 702.

At block 702, a network device determines an encryption key to be used for packet transmissions in a communication network. For example, the packet generation unit 110 may determine the encryption key. In some embodiments, the network devices 102, 104, and 114 of the communication network 100 may use 128-bit advanced encryption standard (AES). In other embodiments, the network devices 102, 104, and 114 of the communication network 100 may use another suitable encryption mechanism. In some embodiments, the network device may be a master network device of the communication network. In this embodiment, the master network device may generate the encryption key and distribute the encryption key to other network devices of the communication network. In one example, the master network device may publish the encryption key in clear text (or plain text). In another example, the master network device may broadcast the encryption key to the other network devices in a beacon message or another suitable unencrypted management message. In another example, the master network device may store the encryption key at a predetermined memory location (e.g., in a predetermined data structure). In one implementation, the master network device may generate and distribute the encryption key periodically (e.g., every X days, every Y hours, etc.). In another implementation, the master network device may generate and distribute the encryption key in response to certain events, such as when the configuration of the vehicle changes, during assembly of the vehicle, during a diagnostic check of the vehicle, and so on. In some embodiments, the master network device may notify a user prior to generating and distributing the encryption key. The user may authorize the master network device to generate and distribute a new encryption key.

In other embodiments, the network device may be a client network device of the communication network. The client network device may receive the encryption key from the master network device and store the encryption key to encrypt subsequent packets transmitted by the client network device. In some embodiments, if the client network device receives the encryption key in the beacon message, the client network device can determine whether the received encryption key matches the stored encryption key. This can enable the client network device to use the most recent version of the encryption key for subsequent packet transmissions.

In some embodiments, if a new client network device joins the communication network, the new client network device may request master network device to transmit the encryption key to the new client network device. The master network device may transmit a unicast packet including the encryption key to the new client network device. Alternatively, the master network device may transmit the encryption key in a broadcast management message or in the next beacon message. After the network device determines the encryption key, the flow continues at block 704.

At block 704, the network device determines an initialization vector for decoding encrypted packets based, at least in part, on the beacon message. For example, the packet generation unit 110 may determine the initialization vector (IV). In some embodiments, the initialization vector may be a random number that may be used to decrypt encrypted packets that are received at the network device. The length (e.g., number of bits) of the initialization vector may depend on the length of the encryption key and/or the encryption mechanism. In existing PLC protocols, the master network device may transmit the initialization vector in a packet to the client network device. In the existing PLC protocols, the client network device may derive the initialization vector based on information in the frame control field of the received packet for decrypting the payload field of the received packet. However, the length of a typical short packet transmitted using S-MAP for vehicular communications may be short (e.g., 12 bytes or 96-bits) and the application data may be transmitted in the frame control field (e.g., the HomePlug AV frame control field). The master network device may be unable to transmit the initialization vector (e.g., 128-bits) in the short packet because the length of the initialization vector may exceed the length of the short packet.

If the network device is a master network device, the master network device may determine and provide initialization vector information to the client network devices. In some embodiments, the initialization vector information may be included in the beacon message transmitted by the master network device. In another embodiment, the initialization vector information may be included in another suitable management message transmitted by the master network device. In some embodiments, the initialization vector information may include a random number generated by the master network device. In another embodiment, the initialization vector information may be predictable in case the beacon message cannot be properly decoded (e.g., because of noise in the communication network). In one implementation, the beacon message may include a sequence number or another suitable indicator that varies in a predefined manner. For example, the beacon message may include a sequence number that is sequentially incremented at each beacon period. In this example, the sequence number of beacon messages may be used as the initialization vector information. The master network device may transmit the initialization vector information multiple times before it is used to ensure that all the client network devices have determined the initialization vector.

If the network device is a client network device, the client network device may determine the initialization vector that will be used for decryption from the initialization vector information received from the master network device. In one embodiment, the initialization vector may be completely contained in the beacon message (or management message). In this embodiment, the client network device may use the received initialization vector to decrypt subsequently received encrypted packets. In another embodiment, the client network device may combine the initialization vector information received in the beacon message along with other known information to derive the initialization vector that will be used for decryption. For example, a hash operation may be performed on a combination of the initialization vector information received in the beacon message and a communication time slot identifier of the client network device to determine the initialization vector for decrypting packets received from the client network device. Referring to the above example where the initialization vector information is a sequence number, a hash operation may be performed on the combination of the sequence number and the communication time slot identifier. In other embodiments, other suitable information may be combined with the initialization vector information to determine the initialization vector for decrypting received packets. Additionally, other suitable combining operations (e.g., concatenation, Boolean logic operations, etc.) may be executed on the initialization vector information and/or the known information to generate the initialization vector. After determining the initialization vector, the flow continues at block 706.

At block 706, the network device exchanges packets with other network devices in the communication network using the encryption key and the initialization vector. In the existing PLC protocols, the payload field may include an application data portion and an error check (e.g., CRC) portion. In the existing PLC protocols, the application data portion may be encrypted and the error check portion may be added (without encryption) to the encrypted application data portion. A receiving network device may receive the packet, verify the CRC, and transmit an appropriate indication in a selective acknowledgement packet. The receiving network device may decrypt the application data portion if the CRC is valid. However, the length of the application data transmitted in a short packet is typically less than a predetermined block of data required for executing the encryption operations (e.g., a 128-bit block size for a 128-bit AES algorithm). Accordingly, the application data portion of the short packet may be combined with the error check portion of the short packet. Encryption operations using the encryption key may be executed on both the application data portion and the error check portion of the short packet. A receiving network device may receive the encrypted short packet including an encrypted application data portion and encrypted error check portion. The receiving network device may decrypt the short packet using the initialization vector, determine the decrypted error check portion, verify the error check portion (e.g., CRC) is valid, and process the decrypted application data portion if the error check portion is valid. From block 706, the flow ends.

In some embodiments, as described above, a transmitting network device may retransmit (or repeat) a packet in multiple communication time slots to improve transmission reliability. In other embodiments, other network devices in the communication network may be designated as "repeater network devices." The repeater network devices may receive an original transmission of a packet from the original transmitting network device and may then retransmit the packet in subsequent communication time slots that are assigned to the original transmitting network device. Operations of the repeater network devices will be further described below in FIGS. 8 and 9.

Figure 8:
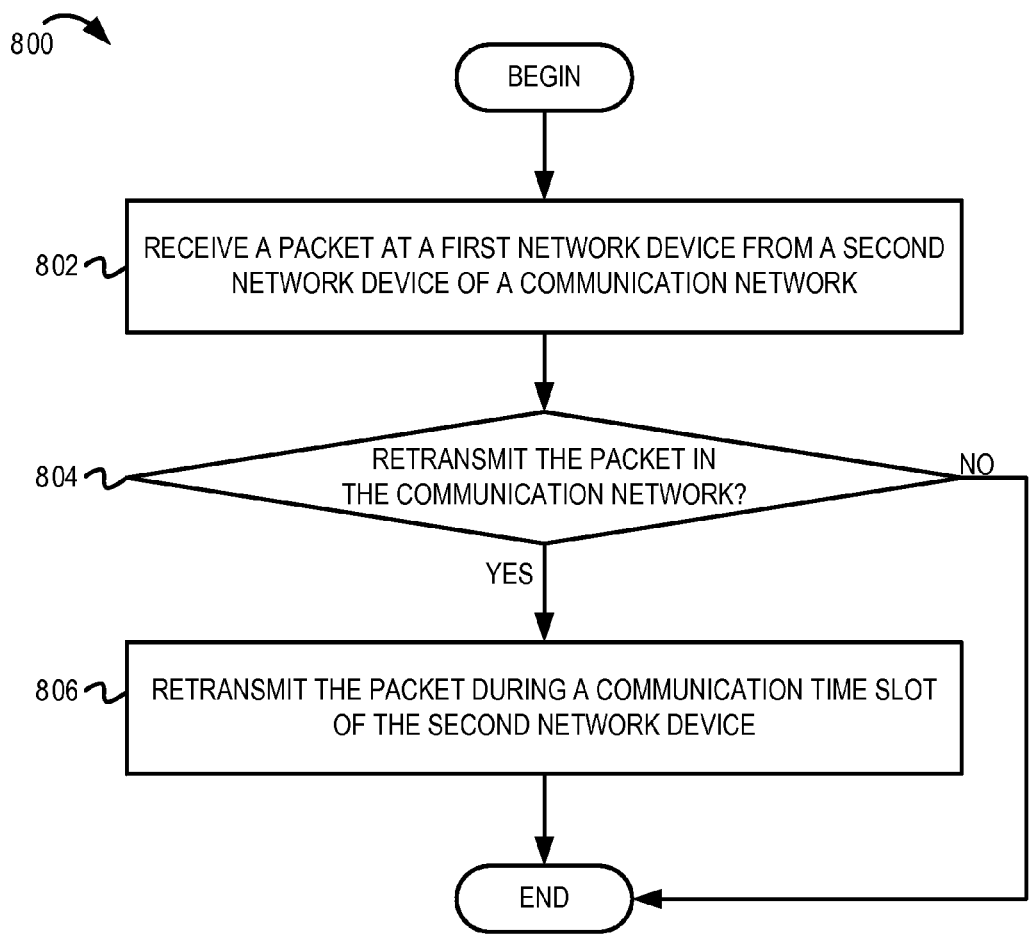
FIG. 8 is a flow diagram illustrating example operations for repeating packets in a communication network.

FIG. 8 is a flow diagram 800 illustrating example operations for repeating packets in a communication network. The flow begins at block 802.

At block 802, a first network device receives a packet from a second network device in a communication network. In some embodiments, the first network device may receive a beacon message from a master network device of the communication network. In another embodiment, the first network device may receive a management message, a short packet (including application data), or another suitable type of packet from the second network device. After receiving the packet, the first network device may decrypt the packet and determine whether the packet was properly received (e.g., without errors) at the first network device. The flow continues at block 804.

At block 804, the first network device determines whether to retransmit the received packet in the communication network. In some embodiments, the master network device may designate the first network device as a repeater network device depending on the position of the first network device in the communication network, the performance of communication links between various network devices in the communication network, etc. In some embodiments, the master network device may designate the first network device to retransmit (or repeat) only certain packets. For example, the master network device may designate the first network device to retransmit packets that originate from a specified network device. In another example, the master network device may designate the first network device to retransmit packets that belong to a specified traffic class. In another example, the master network device may designate the first network device to repeat a specified type of packets or packets that are associated with a specified packet identifier. If the first network device is designated as a repeater for the second network device, the first network device may determine to retransmit (or repeat) the received packet in the communication network and the flow continues at block 806. Otherwise, if the first network device is not designated as a repeater for the second network device, the first network device may determine not to retransmit the packet in the communication network and the flow ends.

At block 806, the first network device retransmits the packet during a communication time slot of the second network device. The second network device that originally generated the packet may also be referred to as the "original transmitting network device." In some embodiments, the first network device may be configured to retransmit a beacon message originally transmitted by the master network device. In some embodiments, the first network device may retransmit the beacon message (along with the master network device) during a subsequent beacon transmission interval. In another embodiment, the first network device may retransmit the beacon message in a communication time slot that is designated for retransmitting beacon messages. In some embodiments, after the master network device designates the repeater network devices in the communication network, the master network device may provide (e.g., broadcast) a retransmission schedule (or retransmission allocation information) to the network devices of the communication network. The retransmission schedule may be part of the slot allocation information provided by the master network device or the retransmission schedule may be provided separately from the slot allocation information. The original transmitting network devices, the repeater network devices, and the receiving network devices may use the retransmission schedule to manage the retransmissions in the communication network, as will be further described below.

Figure 9:
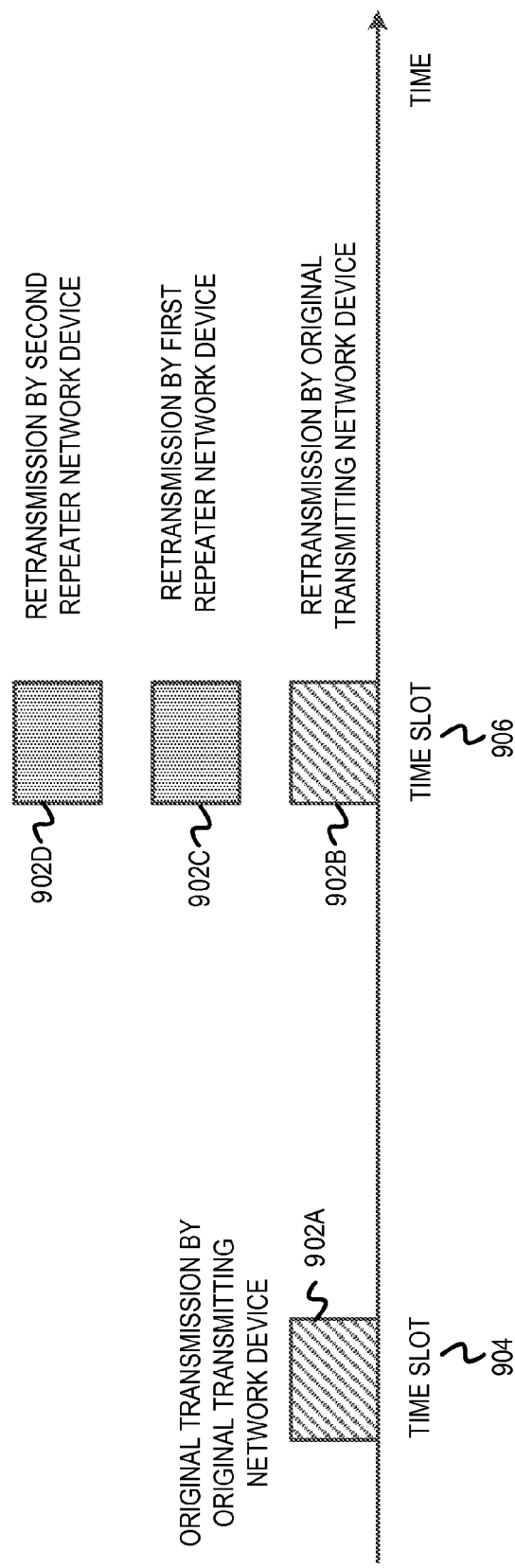
FIG. 9 is an example conceptual diagram illustrating an original transmission and retransmissions by repeater network devices.

FIG. 9 is an example conceptual diagram illustrating an original transmission and retransmissions by repeater network devices. In FIG. 9, the original transmitting network device transmits original packet 902A during communication time slot 904 assigned to the original transmitting network device. The first and the second repeater network devices may receive the packet 902A. In some embodiments, the first and the second repeater network devices may decrypt the packet 902A, verify the CRC, and re-encrypt the packet if the CRC is valid. As depicted in FIG. 9, the original transmitting network device retransmits the packet 902B during the next communication time slot 906 assigned to the original transmitting network device. The first and the second repeater network devices transmit packets 902C and 902D respectively, during the communication time slot 906 assigned to the original transmitting network device. The original transmitting network device and the first and the second repeater network devices can use timing derived from the beacon period (e.g., communication time slots allocated by the master device) to determine when to transit the packets 902B, 902C, and 902D. In one example, the first and the second repeater network devices may determine the communication time slot 906 that is assigned to the original transmitting network device from a retransmission schedule received from the master network device. Thus, the repeater network devices may simultaneously transmit the packet during the same communication time slot when the original transmitting network device retransmits the packet. It is noted that the first and the second repeater network devices transmitting packets 902C and 902D respectively, may also be referred to as the first and the second repeater network devices retransmitting (or repeating) the original packet (e.g., packet 902A).

A receiving network device may also use the retransmission schedule received from the master network device to reliably receive and decode a packet. For example, the receiving network device may determine from the retransmission schedule the one or more communication time slots (e.g., the communication time slots 904 and 906) allocated to the original transmitting network device to receive the original transmission and the retransmissions of the packet. Because the content of the packets 902A, 902B, 902C, and 902D are the same, receiving network devices may reliably receive the packet (without collisions) if they detect the original packet 902A or the retransmitted packets 902B, 902C, and 902D. In some implementations, multiple retransmissions of a packet (e.g., packet 902A) by the original transmitting network device and by one or more repeater network devices may provide reliable delivery of the packet to a receiving network device even without the use of acknowledgement packets. For example, the network devices may transmit the original packet and retransmit the original packet without waiting to receive acknowledgement packets, and the repeater and receiving network devices may not transmit acknowledgement packets after receiving the original packet or a retransmission of the original packet. In some implementations, a receiving network device may use the multiple retransmissions of a packet to improve decoding reliability. For example, the receiving network device may use copy combine of the original transmission and the multiple retransmissions to decode the packet.

In some embodiments, the repeater network device may retransmit the packet during a particular communication time slot of the original transmitting network device. In this embodiment, the repeater network device may be preconfigured or may have a priori knowledge of the schedule of the original transmitting network device and the communication time slots allocated to the original transmitting network device. For example, the repeater network device may determine the communication time slots allocated to the original transmitting network device based on the retransmission schedule received from the master network device. This can enable the repeater network device to retransmit a received packet in a communication time slot of the original transmitting network device. For example, based on the information in the retransmission schedule, the repeater network device may determine to retransmit the packet during the next communication time slot assigned to the original transmitting network device. In another embodiment, the original transmitting network device may include an indication (e.g., in the packet) of when the packet should be retransmitted. For example, the original transmitting network device may include information in the packet that is provided to the repeater network device that indicates the one or more communication time slots that are allocated to the original transmitting network device. The repeater network device may retransmit the packet based on the retransmission information received from the original transmitting network device.

In some embodiments, the repeater network device may miss the first transmission of the packet 902A from the original transmitting network device. The repeater network device may detect a second transmission (also referred to as a first retransmission) of the packet 902B from the original transmitting network device. Accordingly, in some implementations, the packet may include a repetition count field that indicates how many times the packet will be retransmitted. The original transmitting network device may decrement the value in the repetition count field at each retransmission. The repeater network device may use the value in the repetition count field to retransmit the packet received from the original transmitting network device the appropriate number of times. Furthermore, the repeater network device may also decrement the value in the repetition count field at each retransmission so that the content of the packet that is retransmitted by the original transmitting network device is the same as the content of the packet retransmitted by the repeater network device. In the example shown in FIG. 9, when the packet 902B is detected, the first and the second repeater network devices may decrypt the packet 902B, verify the CRC, and re-encrypt the packet if the CRC is valid. In some implementations, using the encryption mechanisms described above with reference to FIG. 7, each repeater network device may decrypt and re-encrypt the packet using the initialization vector that was used by the original transmitting network device to transmit the packet 902B (i.e., the same initialization vector that was used for the retransmission that is received by the repeater network device). In some implementations, the original transmitting network device may use the same initialization vector and encryption on all the retransmissions of the packet. Referring back to FIG. 8, after the first network device retransmits the packet, the flow ends.

In some implementations, the packets 902A-902D may have a predefined accuracy in time alignment. Because the packets are transmitted using OFDM, the time alignment may be within the length of the OFDM guard interval. For example, the timing accuracy of the packets 902A-902D arriving at a receiving network device may be within the length of the OFDM guard interval when the repeater network devices retransmit the packet during a communication time slot of the original transmitting network device. In one example, for a frame control field described in the existing PLC protocols, the length of OFDM guard interval is typically 2 µs because of the relatively short preamble OFDM symbols. In another example, for a short frame control field that is represented using one OFDM symbol frame control, the length of OFDM guard interval may be 14 µs. In another example, the guard interval may be set to a length that is longer than the largest timing error that is expected at the receiving network device. In some implementations, at a receiving network device, as long as all the packets 902B-902D from multiple transmitters are within the guard interval, it will appear as if a signal including a packet was originated from a single transmitter and that the signal went through a multi-path channel before arriving at the receiving network device.

As described above, FIGS. 8 and 9 describe the repeater network device retransmitting the packet during the communication time slot of the original transmitting network device. In other embodiments, the repeater network device may retransmit the packet during communication time slots that are specifically assigned for retransmitting packets. In another embodiment, the repeater network device may retransmit the packet during a communication time slot assigned to the repeater network device. In one example, the communication time slots that are assigned for retransmitting packets and/or the communication time slots that are assigned to a repeater network device may be determined based on the slot allocation information received from the master network device. In some embodiments, the original transmitting network device may include an indication in the originally transmitted packet that requests a repeater network device to retransmit the packet. The original transmitting network device may also include information in the originally transmitted packet that indicates when and how many times the repeater network device should retransmit the packet.

In some embodiments, diagnostic operations may be executed in the communication network (e.g., in the intra-vehicular communication network) to determine the link margin on each communication link of the communication network. The master network device may notify the client network devices to exchange packets to estimate the link margin of each communication link in the communication network. Performance measurements (e.g., signal-to-noise ratio (SNR), attenuation level, etc.) may be determined for each communication link and transmitted to the master network device. The master network device may identify communication links with poor performance measurements. For example, the master network device may identify the communication links associated with an SNR that falls below a threshold SNR, an attenuation level that exceeds a threshold attenuation level, etc. The master network device may use these performance measurements to select one or more repeater network devices for the communication links with poor performance and/or for network devices with poor performance. The master network device may notify the repeater network devices to retransmit packets received from one or more specific network device. Furthermore, in some embodiments, the master network device may also assign repeater network devices to enable "self-healing" in the communication network. For example, if a communication link between two network devices is severed or if a network device is disabled, the master network device may assign repeater network devices to ensure that all the network devices in the communication network receive the packets. In some embodiments, the master network device may also report the performance measurements to an external device for troubleshooting by a service department (at a car dealer) or for validation by an engineering department when the vehicle is first developed or during production.

It should be understood that FIGS. 1-9 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. Although some embodiments describe operations for adaptively allocating communication time slots and transmitting a short packet using the S-MAP in a PLC environment, in other embodiments the operations for adaptively allocating communication time slots and transmitting a short packet using the S-MAP may be extended to other communication networks and communication protocols. For example, the operations for adaptively allocating communication time slots, securely transmitting a short packet, and/or repeating a received short packet may be executed by network devices that implement WLAN communication protocols (e.g., IEEE 802.11 communication protocols), MoCA communication protocols, Ethernet communication protocols, G.hn home networking protocols, and so on. In other embodiments, the operations for adaptively allocating communication time slots and transmitting a short packet using the S-MAP may be extended to a combination of communication protocols. For example, the operations for adaptively allocating communication time slots, securely transmitting a short packet, and/or repeating a received short packet may be executed using a combination of PLC protocols and WLAN communication protocols.

In the existing PLC protocols, a network device typically supports a 16-byte frame control field and/or a 32-byte frame control field. The network device may transmit the frame control field using a predetermined number of OFDM symbols. In some embodiments, the network device 102 may be configured to support a finer granularity of frame control field lengths. For example, the network device 102 may be configured to support an 8-byte frame control field ("short delimiter message"), a 64-byte frame control field, etc. in addition to the existing 16-byte and the 32-byte frame control fields. In this example, if the length of the application data exceeds 16 bytes but is less than 32 bytes, the application data may be transmitted in the 32-byte HomePlug AV frame control field. In some embodiments, the network device 102 may be configured to support any suitable frame control field length that can be mapped to a predetermined number of OFDM symbols. For example, in the existing PLC protocols, the network device may map the 16-byte or the 32-byte frame control field to a single OFDM symbol. In this example, the network device may be configured to support other frame control field lengths that can be mapped to one OFDM symbol.

However, in other embodiments, the number of OFDM symbols that are used to transmit the frame control field may not be taken into consideration when configuring the network device to support a different frame control field length. The number of OFDM symbols that are used to transmit the frame control field may vary depending on the length of the frame control field, reliability and performance specifications, operating communication band, and other suitable considerations. Depending on the length of application data that will be transmitted, the packet generation unit 110 may select an appropriate frame control field length for transmitting the application data. After selecting the frame control field length that should be used to transmit the application data, the packet generation unit 110 may generate the short packet including a preamble field and the frame control field, as described above with reference to FIG. 2. In one embodiment, the frame control field may include control information and the application data. In another embodiment, the frame control field may only include the application data and may not include the control information. The short packet may not include a payload field. In some embodiments, the short packet may also include an indication that the frame control field includes the application data.

In some embodiments, the network device 102 may determine not to transmit the application data within the frame control field. Instead, the application data may be transmitted within a short payload field. In the existing PLC protocols, a PLC device may support a payload length of 136 bytes or 520N bytes (i.e., 520 bytes, 520*2 bytes, etc.). In some embodiments, the PLC device may be configured to support a finer granularity of payload field lengths to support transmission of a short payload field. The payload field of a PLC packet typically includes one or more forward error correction (FEC) blocks (also referred to as PHY blocks). The packet generation unit 110 may select a combination of one or more of the supported FEC blocks to transmit the application data depending on the length of the application data and the FEC block sizes supported by a receiving network device. In one embodiment, the network device 102 may be configured to support smaller FEC block sizes, in addition to existing longer FEC block sizes. For example, the network device 102 may be configured to support: A) a 24-byte FEC block size that includes 16 bytes of application data and 8 bytes of error correction information, B) a 40-byte FEC block size that includes 32 bytes of application data and 8 bytes of error correction information, C) a 72-byte FEC block size that includes 64 bytes of application data and 8 bytes of error correction information, D) a 264-byte FEC block size that includes 256 bytes of application data and 8 bytes of error correction information, E) a 16-byte FEC block size that includes 16 bytes of application data and no error correction information, F) a 32-byte FEC block size that includes 32 bytes of application data and no error correction information, and/or G) a 64-byte FEC block size that includes 64 bytes of application data and no error correction information.

Reducing the granularity of supported payload field lengths and the FEC block sizes can allow the packet generation unit 110 to select an appropriate payload field length, reduce the amount of padding that is added to the application data, and improve data transmission efficiency. In some embodiments, the network device 102 may be configured to support multiples of FEC blocks of the same size in the payload field. For example, instead of supporting one payload field length of 136 bytes, the network device 102 may be configured to support payload field lengths that are a multiple of 136 bytes (e.g., 136N bytes). In another embodiment, the network device 102 may be configured to support FEC blocks of different sizes within the same payload field. The packet generation unit 110 may compare the length of the application data that will be transmitted against a plurality of payload field lengths. Depending on the length of application data that will be transmitted, the packet generation unit 110 can select an appropriate short payload field length for transmitting the application data in the short packet. After selecting the payload field length that should be used to transmit the application data, the first network device can transmit the preamble field, the frame control field including control information, and the payload field including the application data.

In some embodiments, the network devices 102, 104, and 114 may exchange both short packets and long packets. For example, long packets may refer to packets that are transmitted using conventional communication protocols. With reference to the PLC protocols, a long PLC packet may have a payload of 136 bytes or 520*N bytes. The network devices 102, 104, and 114 may exchange long packets to execute diagnostic operations, link establishment operations, etc. The network devices 102, 104, and 114 may exchange short packets after the communication link is established. In one embodiment, the network device 102 may determine whether to transmit the short packet or the long packet depending on the type of application or the type of operations being executed. In another embodiment, the network device 102 may determine whether to transmit the short packet or the long depending on the amount of application data scheduled to be transmitted.

In some embodiments, the network devices 102, 104, and 114 may support multiple transmission modulation mechanisms for transmitting packets using the S-MAP. In some embodiments, the network devices 102 and 104 may support robust OFDM transmission modulation mechanisms (also referred to as ROBO modes) for transmitting the packets. Each ROBO mode may represent a different combination of data rate and payload field length. For example, the network devices may support a HomePlug AV mini-ROBO transmission modulation, a standard ROBO mode, and a high-speed ROBO mode in accordance with existing PLC protocols. In addition, the network devices 102, 104, and 114 may also be configured to support a plurality of new ROBO modes for transmitting short packets with various payload field lengths or frame control field lengths. In some embodiments, one or more of the network devices 102, 104, and 114 may be configured to support other suitable transmission modulation such as, a frame control mode, a transmission modulation that uses bit loading as is implemented by the HomePlug AV/AV2 specifications, etc. In some embodiments, a master network device may allocate communication time slots based on the length of the packet (e.g., the selected frame control field length and/or the selected payload field length) and the transmission modulation that will used for transmitting the packet. For example, if a client network device is scheduled to transmit a long packet using the standard ROBO mode, the master network device may allocate multiple consecutive communication time slots to enable the client network device to transmit the long packet. Alternatively, the master network device may designate multiple consecutive communication time slots as contention-based communication time slots so that the client network device can contend with other network devices to gain control and transmit the long packet during the contention-based communication time slots. For example, the client network device may use the carrier sense multiple access (CSMA) protocol described by the HomePlug AV/AV2/GreenPHY specification to assess the communication medium (e.g., the PLC medium) during the contention-based communication time slots. The client network device that gains control of the contention-based communication time slots may ensure that the length of the packet transmitted during the contention-based communication time slots is less than or equal to the length of the contention-based communication time slots.

In some embodiments, different network devices in the communication network 100 may have different communication and processing capabilities. Each combination of communication and processing capabilities may be referred to as a "device profile." Thus, the communication network may include network devices that have different device profiles. For example, a first network device (e.g., door lock/unlock device) may be configured to receive short packets where the application data is transmitted in the HomePlug AV frame control field. The first network device may not be configured to receive and process packets that include a payload field. In another example, a second network device (e.g., media player device) may be unable to receive and decode application data that was transmitted in the HomePlug AV frame control field or in the short payload lengths, etc. In another example, a third network device may be configured to receive and process the short packets and the long packets. In some embodiments, in addition to the identity of the network device, the type of packet, and the class of traffic assigned to a communication time slot, the slot allocation table may also indicate the device profile of the network device associated with the communication time slot. This can enable network devices with less capable device profiles to disregard the packets and operate in the power save mode during the communication time slot depending on the device profile associated with the communication time slot.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module," "unit," or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, electronic device, or other programmable data processing apparatus, create means for implementing the functions/acts specified in the flowchart and/or block diagram block or blocks.

These computer program instructions may also be stored in a computer readable medium that can direct a computer, other programmable data processing apparatus, or other electronic devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
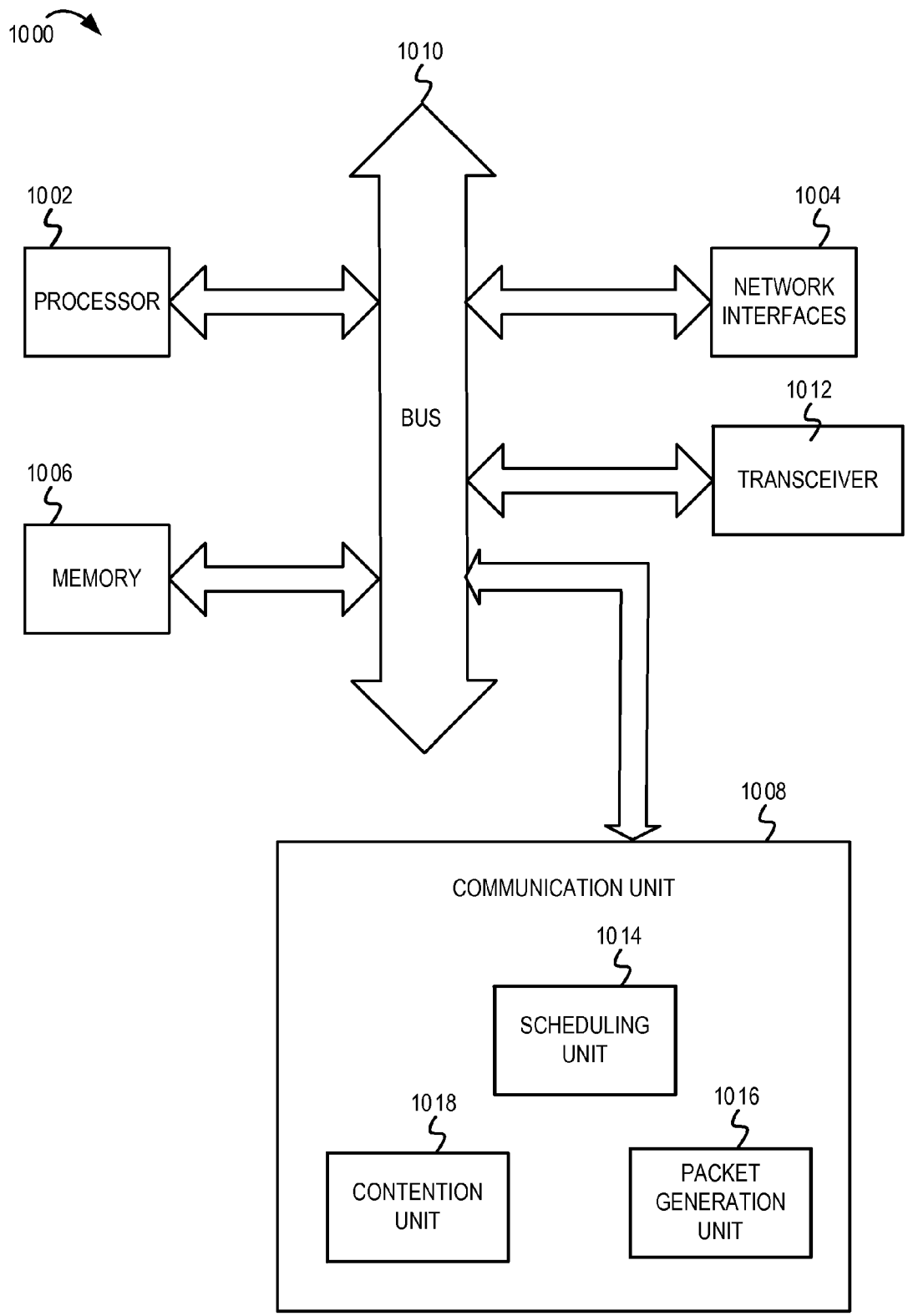
FIG. 10 is a block diagram of one embodiment of an electronic device including a slot allocation mechanism for transmitting a short packet.

FIG. 10 is a block diagram of one embodiment of an electronic device 1000 including a slot allocation mechanism for transmitting a short packet. In some embodiments, the electronic device 1000 may be a communication component within a system, such as a plug-in electric vehicle (PEV), a hybrid electric vehicle, a gas-powered vehicle, an electric vehicle supply equipment (EVSE or charging station), an aircraft, electronic machinery, or another system with communication capabilities. In another embodiment, the electronic device 1000 may be a desktop computer, a laptop computer, a tablet computer, a mobile phone, a smart appliance, a powerline communication device, a gaming console, a network bridging device, an access point, an electric vehicle, a gas-powered vehicle, a charging station, or other electronic device with communication capabilities. The electronic device 1000 includes a processor 1002 which can include multiple processors, multiple cores, multiple nodes, and/or implementing multi-threading, etc. The electronic device 1000 includes a memory 1006. The memory 1006 may be system memory (e.g., one or more of cache, SRAM, DRAM, zero capacitor RAM, Twin Transistor RAM, eDRAM, EDO RAM, DDR RAM, EEPROM, NRAM, RRAM, Silicon-Oxide-Nitride-Oxide-Silicon (SONOS), PRAM, etc.) or any one or more of the above already described possible realizations of computer-readable storage media. The electronic device 1000 also includes a bus 1010 (e.g., Peripheral Component Interconnect (PCI), Industry Standard Architecture (ISA), PCI-Express, HyperTransport®, InfiniBand®, NuBus, Advanced High-performance Bus (AHB), Advanced eXtensible Interface (AXI), etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). The electronic device 1000 includes a transceiver 1012. The transceiver 1012 may include a receiver and a transmitter as described above with reference to FIG. 1. In some embodiments, the transceiver 1012 may be implemented as part of the network interface 1004. In other embodiments, the transceiver 1012 may be implemented separate from the network interface 1004 and may be coupled with the bus 1010, as depicted in FIG. 10.

The electronic device 1000 also includes a communication unit 1008. The communication unit 1008 includes a scheduling unit 1014, a packet generation unit 1016, and a contention unit 1018. The scheduling unit 1014 may allocate communication time slots to network devices of a communication network. For example, the scheduling unit 1014 may allocate the communication slots based, at least in part, on the latency specifications of packets scheduled to be transmitted by the network devices, as described above with reference to FIGS. 3-4C. The scheduling unit 1014 may also determine what communication slots are assigned to the electronic device 1000 for transmitting packets. The contention unit 1018 may contend with other network devices for control of a contention-based communication time slot based, at least in part, on a priority level of a packet scheduled to be transmitted, as described above with reference to FIGS. 5 and 6. Additionally, if configured as a repeater network device, the transceiver 1012 may retransmit packets received from an original transmitting network device as described above with reference to FIGS. 8 and 9. The packet generation unit 1016 may generate the short packet by including the application data in the frame control field with a selected frame control field length (or in a short payload field) as described above. The packet generation unit 1016 may also encrypt and decrypt packets for secure communication of packets as described above with reference to FIG. 7.

Any one of these functionalities may be partially (or entirely) implemented in hardware and/or on the processor 1002. For example, the functionality may be implemented with a system-on-a-chip (SoC), an application specific integrated circuit (ASIC), in logic implemented in the processor 1002, in a co-processor on a peripheral device or card, etc. Further, realizations may include fewer or additional components not illustrated in FIG. 10 (e.g., video cards, audio cards, additional network interfaces, peripheral devices, etc.). For example, in addition to the processor 1002 coupled with the bus 1010, the communication unit 1008 may include at least one additional processor. In another example, the communication unit 1008 may include one or more radio transceivers, processors, memory, and other logic to implement the communication protocols and related functionality. The processor 1002, the memory 1006, and the network interfaces 1004 are coupled to the bus 1010. Although illustrated as being coupled to the bus 1010, the memory 1006 may be coupled to the processor 1002. For example, in addition to the processor 1002 coupled with the bus 1010, the communication unit 1008 may comprise at least one additional processor.

While the embodiments are described with reference to various implementations and exploitations, it will be understood that these embodiments are illustrative and that the scope of the disclosure is not limited to them. In general, slot allocation techniques for implementing a slotted message access protocol for transmitting short packets in a communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the disclosure.

What is claimed is:

1. A method for packet transmissions in a communication network, the method comprising:
    determining, by a first network device, that a second network device will transmit a first packet associated with a first traffic class in the communication network;
    allocating a first communication time slot of a beacon period to the second network device based, at least in part, on the first traffic class;
    indicating to the second network device the first communication time slot during which the second network device can transmit the first packet;
    designating a third network device as a repeater network device for the second network device for retransmitting the first packet during a second communication time slot allocated to the second network device; and
    providing a retransmission schedule to network devices of the communication network including the second network device and the third network device, the retransmission schedule indicating an allocation of the second communication time slot to the second network device for retransmission of the first packet.

2. The method of claim 1, wherein allocating the first communication time slot comprises determining the first communication time slot is one of a plurality of communication time slots assigned to the first traffic class.

3. The method of claim 1, further comprising:
determining that a fourth network device will transmit a second packet associated with a second traffic class in the communication network;
allocating a third communication time slot of the beacon period to the second network device based, at least in part, on the second traffic class; and
indicating to the fourth network device the second communication time slot during which the fourth network device can transmit the second packet.

4. The method of claim 3, wherein the first communication time slot and the third communication time slot are contention-free communication time slots.

5. The method of claim 1, further comprising:
determining the second communication time slot of the beacon period that is assigned to the first traffic class; and
allocating the second communication time slot to the second network device for retransmission of the first packet.

6. The method of claim 1, further comprising, prior to allocating the first communication time slot to the second network device,
determining that the first communication time slot is allocated to a fourth network device for transmitting a second packet of a second traffic class, wherein the second traffic class is associated with a lower priority level as compared to the first traffic class; and
allocating a third communication time slot of the beacon period to the fourth network device for transmitting the second packet based, at least in part, on the second traffic class being associated with the lower priority level,
wherein said allocating the first communication time slot to the second network device comprises re-allocating the first communication time slot from the fourth network device to the second network device after allocating the third communication time slot to the fourth network device.

7. The method of claim 1, further comprising:
allocating a third communication time slot of the beacon period to the first network device for transmitting a second packet associated with a second traffic class.

8. The method of claim 7, further comprising:
determining a length of application data associated with the second packet does not exceed a threshold length; and
transmitting the application data in a frame control field of the second packet in response to determining the length of the application data does not exceed the threshold length, wherein the second packet does not include a payload field.

9. The method of claim 7, further comprising:
determining a number of times to retransmit the second packet based, at least in part, on the second traffic class.

10. The method of claim 1, further comprising:
providing a slot allocation table from the first network device to the second network device, wherein the slot allocation table indicates a plurality of communication time slots that are allocated to a plurality of network devices of the communication network, wherein the slot allocation table further indicates a traffic class assigned to each of the plurality of communication time slots, wherein the plurality of communication time slots include the first communication time slot and the second communication time slot, and the plurality of network devices include the first network device, the second network device, and the third network device.

11. The method of claim 1, further comprising:
determining to transmit a second packet from the first network device during one of a plurality of contention-based time slots in the communication network;
determining that a third communication time slot is one of the plurality of contention-based time slots; and
executing contention operations with at least the second network device to determine whether to transmit the second packet during the third communication time slot based, at least in part, on a priority level associated with the second packet.

12. The method of claim 1, further comprising:
receiving a second packet from a fourth network device during a third communication time slot;
determining that the fourth network device will retransmit the second packet during a fourth communication time slot allocated to the fourth network device;
determining that the first network device is a repeater network device for the fourth network device; and
determining to retransmit the second packet from the first network device during the fourth communication time slot.

13. The method of claim 1, further comprising:
providing an encryption key and initialization vector information to the second network device in a beacon message for transmission of the first packet.

14. The method of claim 1, further comprising:
determining to transmit a second packet during a third communication time slot; and
encrypting a combination of an application data portion of the second packet and an error check portion of the second packet to generate an encrypted second packet for transmission.

15. The method of claim 1, further comprising:
determining initialization vector information included in a beacon message;
determining an initialization vector based, at least in part, on a combination of the initialization vector information and communication time slot information; and
decrypting the first packet based, at least in part, on the initialization vector.

16. The method of claim 1, further comprising:
determining to configure the first network device in a power save operating mode during a third communication time slot in response to at least one member of the group consisting of:
determining that the third communication time slot is not assigned to any network device of the communication network, and
determining that the first network device should not listen for packets that are scheduled to be transmitted in the third communication time slot.

17. The method of claim 1, wherein:
the first network device and the second network device are included in the communication network of a vehicle.

18. The method of claim 1, wherein the communication network is a powerline communication network and each of the first network device and the second network device, and the third network device implements a powerline communication protocol.

19. The method of claim 1, wherein the first packet is associated with a first latency and a first cycle time, further comprising:
  determining, by the first network device, that a fourth network device will transmit a second packet associated with a second latency and a second cycle time, wherein the first latency specifies less latency than the second latency, and the first cycle time is less than the second cycle time;
  allocating, by the first network device, a first plurality of communication time slots of the beacon period to the second network device based, at least in part, the first latency and the first cycle time, wherein the first plurality of communication time slots include at least the first communication time slot;
  allocating, by the first network device, a second plurality of communication time slots of the beacon period to the fourth network device based, at least in part, on the second latency and the second cycle time, wherein a first quantity of the first plurality of communication time slots is greater than a second quantity of the second plurality of communication time slots; and
  indicating, to the second network device and the fourth network device, that the first plurality of communication time slots are allocated to the second network device and that the second plurality of communication time slots are allocated to the fourth network device.

20. The method of claim 19, wherein said indicating comprises providing a slot allocation table from the first network device to the second network device and the fourth network device that indicates one or more communication time slots allocated to the first network device, the first plurality of communication time slots allocated to the second network device, and the second plurality of communication time slots allocated to the fourth network device.

21. The method of claim 1, wherein the first traffic class is determined based, at least in part on, a cycle time of traffic of the first traffic class or a latency of traffic of the first traffic class.

22. A first network device comprising:
  a processor; and
  a memory to store instructions, which when executed by the processor, cause the first network device to:
    determine that a second network device will transmit a first packet associated with a first traffic class in a communication network;
    determine a first communication time slot of a beacon period that is associated with the first traffic class;
    allocate the first communication time slot to the second network device based, at least in part, on the first traffic class;
    indicate to the second network device the first communication time slot during which the second network device can transmit the first packet;
    designate a third network device as a repeater network device for the second network device for retransmitting the first packet during a second communication time slot allocated to the second network device; and
    provide a retransmission schedule to network devices of the communication network including the second network device and the third network device, the retransmission schedule indicating an allocation of the second communication time slot to the second network device for retransmission of the first packet.

23. The first network device of claim 22, wherein the instructions, which when executed by the processor, further cause the first network device to:
  determine that a fourth network device will transmit a second packet associated with a second traffic class in the communication network;
  allocate a third communication time slot of the beacon period to the second network device based, at least in part, on the second traffic class; and
  indicate to the fourth network device the second communication time slot during which the fourth network device can transmit the second packet.

24. The first network device of claim 22, wherein the instructions, which when executed by the processor, further cause the first network device to:
  determine the second communication time slot of the beacon period that is assigned to the first traffic class; and
  allocate the second communication time slot to the second network device for retransmission of the first packet.

25. The first network device of claim 22, wherein the first traffic class is determined based, at least in part on, a cycle time of traffic of the first traffic class or a latency of traffic of the first traffic class.

26. A non-transitory machine-readable storage medium having machine executable instructions stored therein, the machine executable instructions comprising instructions to:
  determine, by a first network device, that a second network device will transmit a first packet associated with a first traffic class in a communication network;
  determine a first communication time slot of a beacon period that is associated with the first traffic class;
  allocate the first communication time slot to the second network device based, at least in part, on the first traffic class;
  indicate to the second network device the first communication time slot during which the second network device can transmit the first packet;
  designate a third network device as a repeater network device for the second network device for retransmitting the first packet during a second communication time slot allocated to the second network device; and
  provide a retransmission schedule to network devices of the communication network including the second network device and the third network device, the retransmission schedule indicating an allocation of the second communication time slot to the second network device for retransmission of the first packet.

27. The non-transitory machine-readable storage medium of claim 26, wherein the machine executable instructions further comprise instructions to:
  determine that a fourth network device will transmit a second packet associated with a second traffic class in the communication network;
  allocate a third communication time slot of the beacon period to the second network device based, at least in part, on the second traffic class; and
  indicate to the fourth network device the second communication time slot during which the fourth network device can transmit the second packet.

28. The non-transitory machine-readable storage medium of claim 26, wherein the machine executable instructions further comprise instructions to:
  receive a second packet from a fourth network device during a third communication time slot;

determine that the fourth network device will retransmit the second packet during a fourth communication time slot allocated to the fourth network device;

determine that the first network device is a repeater network device for the fourth network device; and determine to retransmit the second packet from the first network device during the fourth communication time slot.

29. The non-transitory machine-readable storage medium of claim 26, wherein the first traffic class is determined based, at least in part on, a cycle time of traffic of the first traffic class or a latency of traffic of the first traffic class.

30. A method for packet transmissions in a communication network, the method comprising:

determining, by a first network device, that a second network device will transmit a first packet associated with a first traffic class in the communication network;

allocating a first communication time slot of a beacon period to the second network device based, at least in part, on the first traffic class;

indicating to the second network device the first communication time slot during which the second network device can transmit the first packet;

allocating a second communication time slot of the beacon period to the first network device for transmitting a second packet associated with a second traffic class;

determining that a length of application data associated with the second packet does not exceed a threshold length; and transmitting the application data in a frame control field of the second packet in response to determining the length of the application data does not exceed the threshold length, wherein the second packet does not include a payload field.

* * * * *